United States Patent
Van Kampen

(10) Patent No.: US 12,450,914 B2
(45) Date of Patent: Oct. 21, 2025

(54) DETECTING OBJECTS NEAR THE CART

(71) Applicant: Oshkosh Corporation, Oshkosh, WI (US)

(72) Inventor: Leo Van Kampen, Conestogo (CA)

(73) Assignee: Oshkosh Corporation, Oshkosh, WI (US)

( * ) Notice: Subject to any disclaimer, the term of this patent is extended or adjusted under 35 U.S.C. 154(b) by 5 days.

(21) Appl. No.: 18/646,408

(22) Filed: Apr. 25, 2024

(65) Prior Publication Data

US 2024/0362921 A1    Oct. 31, 2024

Related U.S. Application Data

(60) Provisional application No. 63/462,867, filed on Apr. 28, 2023.

(51) Int. Cl.
| | |
|---|---|
| *G06V 20/56* | (2022.01) |
| *B65F 3/02* | (2006.01) |
| *G06T 7/73* | (2017.01) |
| *H04N 23/90* | (2023.01) |

(52) U.S. Cl.
CPC ............... *G06V 20/56* (2022.01); *B65F 3/02* (2013.01); *G06T 7/73* (2017.01); *H04N 23/90* (2023.01); *G06T 2200/24* (2013.01)

(58) Field of Classification Search
CPC .... B65F 2210/168; B65F 1/14; B65F 1/1426; B65F 2210/108; B65F 2210/128; B65F 2210/1443; B65F 2210/148; B65F 2210/172; B65F 2210/182
USPC .......................................... 348/148
See application file for complete search history.

(56) References Cited

U.S. PATENT DOCUMENTS

| | | | |
|---|---|---|---|
| 11,899,460 B2 * | 2/2024 | Koga | G05D 1/247 |
| 2020/0342240 A1 * | 10/2020 | Szoke-Sieswerda | B65F 3/041 |
| 2020/0369468 A1 * | 11/2020 | Searle | B65F 3/00 |
| 2021/0271884 A1 * | 9/2021 | Wildgrube | G06V 20/58 |
| 2021/0292086 A1 * | 9/2021 | Mahan | G06V 20/56 |
| 2022/0258966 A1 * | 8/2022 | Maroney | B65F 3/02 |
| 2024/0359911 A1 | 10/2024 | Codega et al. | |

* cited by examiner

*Primary Examiner* — Masum Billah
(74) *Attorney, Agent, or Firm* — Foley & Lardner LLP

(57) ABSTRACT

A refuse vehicle can include a first camera, a second camera, and one or more processing circuits. The one or more processing circuits can communicate with the first camera and the second camera. The one or more processing circuits can receive first data associated with a collection site proximate to the refuse vehicle, detect a first object and a second object based on the first data, generate one or more bounding boxes to establish a dimension for the first object, and determine a position of the first object relative to the second object.

20 Claims, 21 Drawing Sheets

DETECTING OBJECTS NEAR THE CART

CROSS-REFERENCE TO RELATED PATENT APPLICATIONS

This application claims the benefit of and priority to U.S. Provisional Patent Application No. 63/462,867, filed on Apr. 28, 2023, the entirety of which is incorporated by reference herein.

BACKGROUND

Refuse vehicles can collect refuse from a variety of locations.

SUMMARY

At least one embodiment relates to a refuse vehicle. The refuse vehicle can include a first camera. The first camera can be disposed proximate to an under carriage of the refuse vehicle. The first camera can capture a first area extending from the refuse vehicle. The refuse vehicle can include a second camera. The second camera can be disposed on a side member of the refuse vehicle. The second camera can be located superior to the first camera. The second camera can capture a second area extending from the refuse vehicle. The refuse vehicle can include one or more processing circuits. The one or more processing circuits can communicate with the first camera and the second camera. The one or more processing circuits can receive, from the first camera and the second camera, first data associated with a collection site proximate to the refuse vehicle. The collection site can include a first object and a second object. The one or more processing circuits can detect, responsive to receipt of the first data, the first object and the second object based on the first data. The one or more processing circuits can generate, for the first object, one or more bounding boxes to establish a dimension for the first object. The one or more processing circuits can determine, using the one or more bounding boxes, a position of the first object relative to the second object. The first camera can be obstructed, by the first object or the second object, from capturing at least a portion of an area that includes the collection site. The second camera can be unobstructed from capturing the at least a portion of the area that includes the collection site.

At least one embodiment relates to a refuse vehicle. The refuse vehicle can include a camera. The camera can be disposed on the refuse vehicle. The camera can capture an area extending from the refuse vehicle. The refuse vehicle can include one or more processing circuits. The one or more processing circuits can communicate with the camera. The one or more processing circuits can receive, from the camera, first data associated with a collection site proximate to the refuse vehicle. The collection site can include a first object and a second object. The one or more processing circuits can detect, responsive to receipt of the first data, the first object based on the first data. The one or more processing circuits can generate, for the first object, one or more bounding boxes to establish a dimension for the first object. The one or more processing circuits can determine, using the one or more bounding boxes, a position of the first object relative to the second object.

At least one embodiment relates to a control system. The control system can be for a refuse vehicle. The control system can include one or more processing circuits. The one or more processing circuits can communicate with a camera of the refuse vehicle. The one or more processing circuits can receive, from the camera, first data associated with a collection site proximate to the refuse vehicle. The collection site can include a first object and a second object. The one or more processing circuits can detect, responsive to receipt of the first data, the first object based on the first data. The one or more processing circuits can generate, for the first object, one or more bounding boxes to establish a dimension for the first object. The one or more processing circuits can determine, using the one or more bounding boxes, a position of the first object relative to the second object.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a detection and warning system (e.g., an alert system, a control system, etc.) is configured to obtain image data of a lift apparatus (e.g., a grabber assembly, an arm, a track, etc.) of a refuse vehicle and a target waste receptacle. The lift apparatus may be configured to grasp the waste receptacle when operated. However, if the lift apparatus and the waste receptacle are not properly aligned, the lift apparatus may knock or tip over the waste receptacle, therefore requiring the operator of the refuse vehicle to exit the cabin of the refuse vehicle, and pick up the spilled waste. A controller obtains the image data and uses the image data to predict if operation of the lift apparatus will knock over the waste receptacle. The controller can operate an alert system (e.g., warning lights, flashers, speakers, a display screen, etc.) to notify the operator that the lift apparatus is predicted to knock over the waste receptacle. The controller may also limit operation of the lift apparatus if the lift apparatus is predicted to knock over the waste receptacle.

Figure 1:
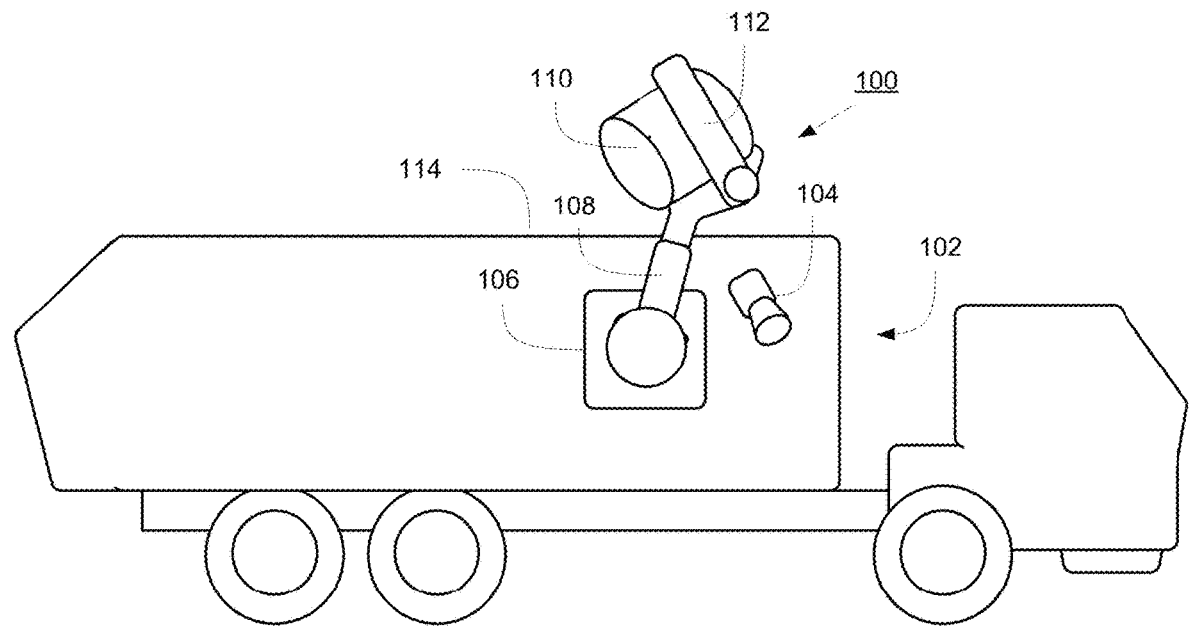
FIG. 1 is a schematic diagram of a system for detecting and picking up a waste receptacle, according to some embodiments.

Referring to FIG. 1, there is a system 100 for detecting and picking up a waste receptacle. The system 100 comprises a camera 104, an arm-actuation module 106, and an arm 108 for collecting the waste from a waste receptacle 110. According to some embodiments, the system 100 can be mounted on a waste-collection vehicle 102 (e.g., a refuse vehicle, a waste collection vehicle, a commercial vehicle, a vehicle with a lift apparatus, etc.). When the camera 104 detects the waste receptacle 110, for example along a curb, arm-actuation module 106 moves the arm 108 so that the waste receptacle 110 can be dumped into the waste-collection vehicle 102.

A waste receptacle is a container for collecting or storing garbage, recycling, compost, and other refuse, so that the garbage, recycling, compost, or other refuse can be pooled with other waste, and transported for further processing. Generally speaking, waste may be classified as residential, commercial, industrial, etc. As used here, a "waste receptacle" may apply to any of these categories, as well as others. Depending on the category and usage, a waste receptacle may take the form of a garbage can, a dumpster, a recycling "blue box", a compost bin, etc. Further, waste receptacles may be used for curb-side collection (e.g., at certain residential locations), as well as collection in other specified locations (e.g., in the case of dumpster collection).

The camera 104 is positioned on the waste-collection vehicle 102 so that, as the waste-collection vehicle 102 is driven along a path, the camera 104 can capture real-time images adjacent to or in proximity of the path.

The arm 108 is used to grasp and move the waste receptacle 110. The particular arm that is used in any particular embodiment may be determined by such things as the type of waste receptacle, the location of the arm 108 on the waste-collection vehicle, etc.

The arm 108 is generally movable, and may comprise a combination of telescoping lengths, flexible joints, etc., such that the arm 108 can be moved anywhere within a three-dimensional volume that is within range of the arm 108.

According to some embodiments, the arm 108 may comprise a grasping mechanism 112 for grasping the waste receptacle 110. The grasping mechanism 112 may include any combination of mechanical forces (e.g., friction, compression, etc.) or magnetic forces in order to grasp the waste receptacle 110.

The grasping mechanism 112 may be designed for complementary engagement with a particular type of waste receptacle 110. For example, in order to pick up a cylindrical waste receptacle, such as a garbage can, the grasping mechanism 112 may comprise opposed fingers, or circular claws, etc., that can be brought together or cinched around the garbage can. In other cases, the grasping mechanism 112 may comprise arms or levers for complementary engagement with receiving slots on the waste receptacle.

Generally speaking, the grasping mechanism 112 may be designed to complement a specific waste receptacle, a specific type of waste receptacle, a general class of waste receptacles, etc.

The arm-actuation module 106 is generally used to mechanically control and move the arm 108, including the grasping mechanism 112. The arm-actuation module 106 may comprise actuators, pneumatics, etc., for moving the arm. The arm-actuation module 106 is electrically controlled by a control system for controlling the movement of the arm 108. The control system can provide control instructions to the arm-actuation module 106 based on the real-time images captured by the camera 104.

The arm-actuation module 106 controls the arm 108 in order to pick up the waste receptacle 110 and dump the waste receptacle 110 into the bin 114 of the waste-collection vehicle 102. In order to accomplish this, the control system that controls the arm-actuation module 106 verifies whether a pose candidate derived from an image captured by the camera 104 matches a template representation corresponding to a target waste receptacle.

However, in order to be able to verify whether a pose candidate matches a template representation, the template representation must first be created. First, it is necessary to create template representations. Second, the template representations can be used to verify pose candidates based on real-time images. Pose candidates will be described in further detail below, after the creation of template representations is described.

Figure 2:
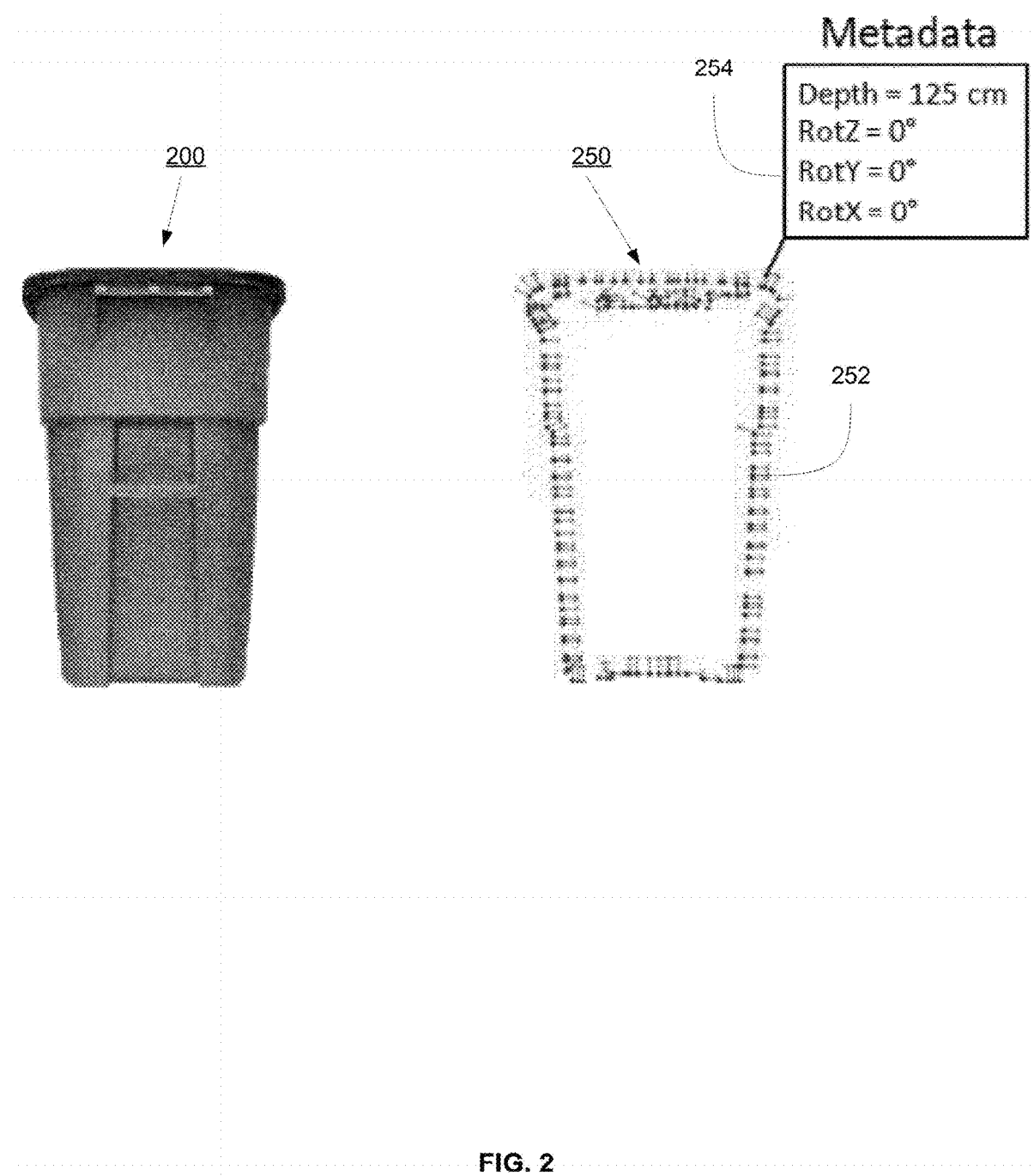
FIG. 2 is a pictorial representation of a waste receptacle and template representation associated with the waste receptacle, according to some embodiments.

Referring to FIG. 2, there is shown an example of a waste receptacle 200 and a template representation of a single pose 250 created in respect of the waste receptacle 200.

The template representation 250 is created by capturing multiple images of the object 200. These multiple images are captured by taking pictures at various angles and scales (depths) around the object 200. When a sufficient number of images have been captured for a particular object 200, the images are processed.

The final product of this processing is the template representation 250 associated with the object 200. In particular, the template representation 250 comprises gradient information data 252 and pose metadata 254. The complete object representation consists of a set of templates, one for each pose.

The gradient information 252 is obtained along the boundary of the object 200 as found in the multiple images. The pose metadata 254 are obtained from the pose information, such as the angles and scales (depths) at which each of the multiple images was captured. For example, the template representation 250 is shown for a depth of 125 cm, with no rotation about the X, Y, or Z axes.

Figure 3:
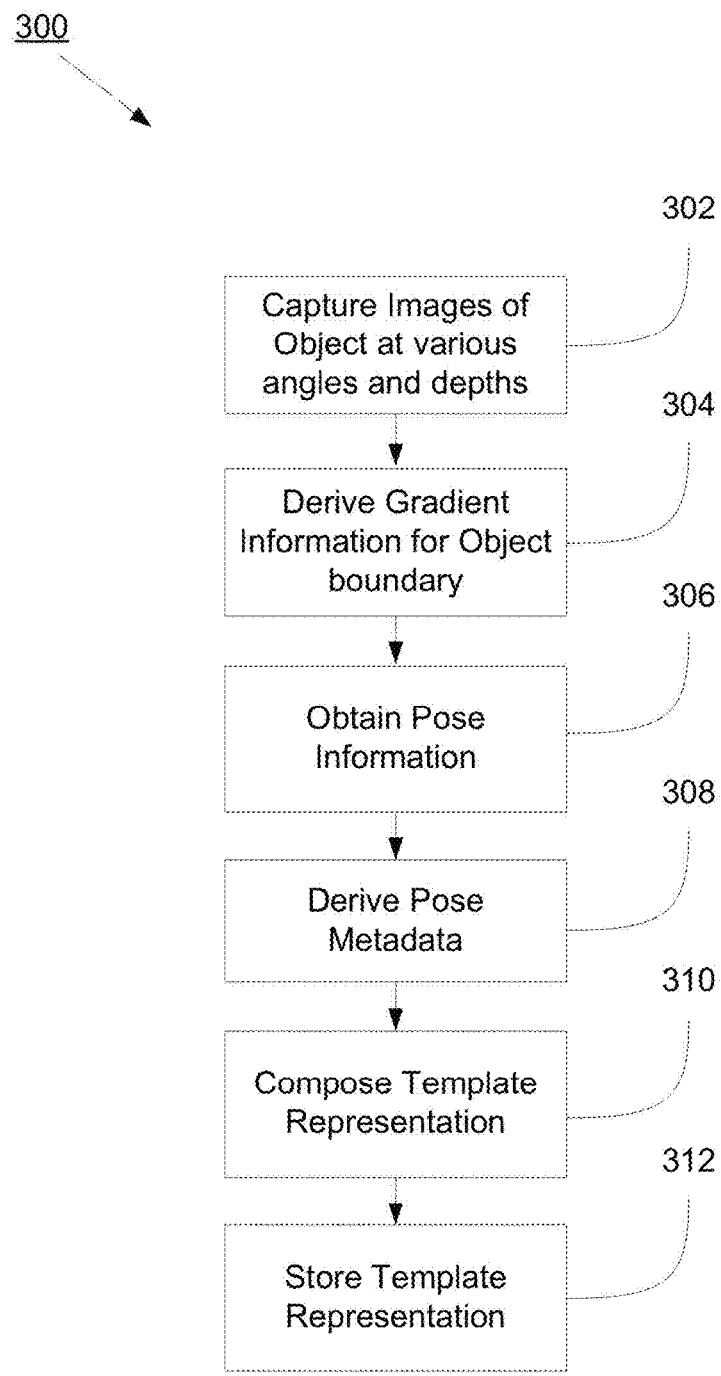
FIG. 3 is a flow diagram depicting a method for creating a representation of an object, according to some embodiments.

Referring to FIG. 3, there is shown a method 300 for creating a representation of an object.

The method begins at step 302, when images of an object are captured at various angles and scales (depths). The images are captured by taking pictures of an object, such as the waste receptacle 200, at various angles and scales (depths). Each image is associated with pose information, such as the depth, and the three-dimensional position and/or rotation of the camera in respect of a reference point or origin.

At step 304, gradient information is derived for the object boundary for each image captured. For example, as seen in FIG. 2, the gradient information is represented by the gradient information data 252. As can be seen, the gradient field comprising the gradient information data 252 corresponds to the boundaries (edges) of the waste receptacle 200.

At step 306, pose information associated with each image is obtained. For example, this may be derived from the position of the camera relative to the object, which can be done automatically or manually, depending on the specific camera and system used to capture the images.

At step 308, pose metadata are derived based on the pose information associated with each image. The pose metadata are derived according to a prescribed or pre-defined format or structure such that the metadata can be readily used for subsequent operations such as verifying whether a pose candidate matches a template representation.

At step 310, a template representation is composed using the gradient information and pose metadata that were previously derived. As such, a template representation comprises gradient information and associated pose metadata corresponding to each image captured.

At step 312, the template representation is stored so that it can be accessed or transferred for future use. Once the template representations have been created and stored, they can be used to verify pose candidates derived from real-time images, as will be described in further detail below. According to some embodiments, the template representations may be stored in a database. According to some embodiments, the template representations (including those in a database) may be stored on a non-transitory computer-readable medium. For example, the template representations may be stored in database 418, as shown in FIG. 4, and further described below.

Figure 4:
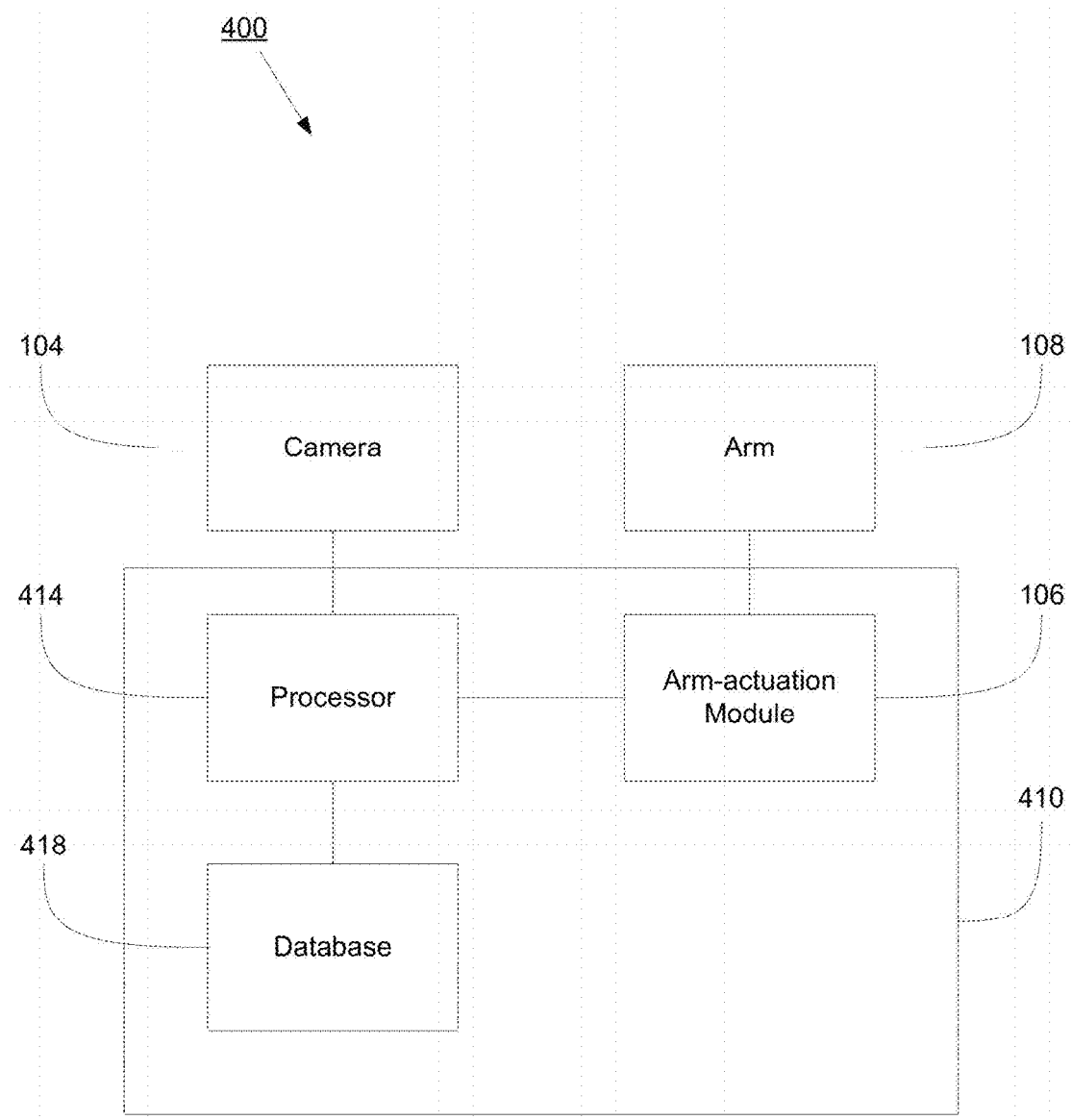
FIG. 4 is a network diagram showing a system for detecting and picking up a waste receptacle, according to some embodiments.

Referring to FIG. 4, there is shown a system 400 for detecting and picking up a waste receptacle. The system comprises a control system 410, a camera 104, and an arm 108. The control system 410 comprises a processor 414, a database 418, and an arm-actuation module 106. According to some embodiments, the system 400 can be mounted on or integrated with a waste-collection vehicle, such as waste-collection vehicle 102.

In use, the camera 104 captures real-time images adjacent to the waste-collection vehicle as the waste-collection vehicles is driven along a path. For example, the path may be a residential street with garbage cans placed along the curb. The real-time images from the camera 104 are communicated to the processor 414. The real-time images from the camera 104 may be communicated to the processor 414 using additional components such as memory, buffers, data buses, transceivers, etc., which are not shown.

The processor 414 is configured to recognize a waste receptacle, based on an image that it receives from the camera 104 and a template representation stored in the database 418.

Figure 5:
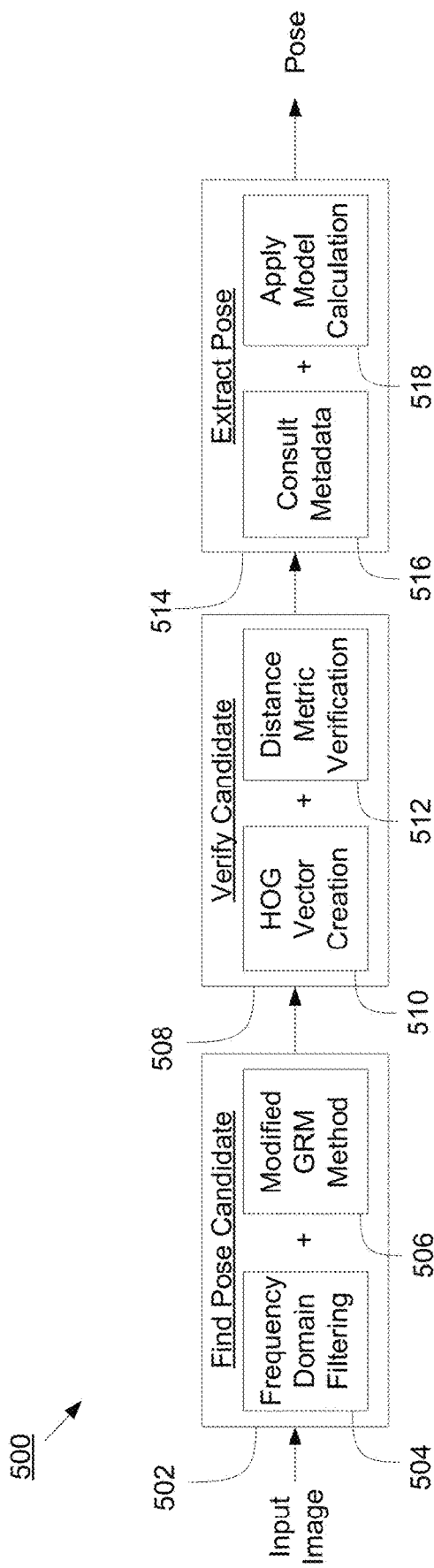
FIG. 5 is a flow diagram depicting a method pipeline used to detect and locate a waste receptacle, according to some embodiments.

Referring to FIG. 5, a general method 500 for detecting and locating a waste receptacle is shown, such as can be performed by the processor 414. The method 500 can be described as including the steps of generating a pose candidate 502, verifying the pose candidate 508, and calculating the location of the recognized waste receptacle 514 (i.e., extracting the pose).

The generate a pose candidate step 502 can be described in terms of frequency domain filtering 504 and a gradient-response map method 506. The step of verifying the pose candidate 508 can be described in terms of creating a histogram of oriented gradients (HOG) vector 510 and a distance-metric verification 512. The extract pose step 514 (in which the location of the recognized waste receptacle is calculated) can be described in terms of consulting the pose metadata 516, and applying a model calculation 518. The step of consulting the pose metadata 516 generally requires retrieving the pose metadata from the database 418.

Figure 6:
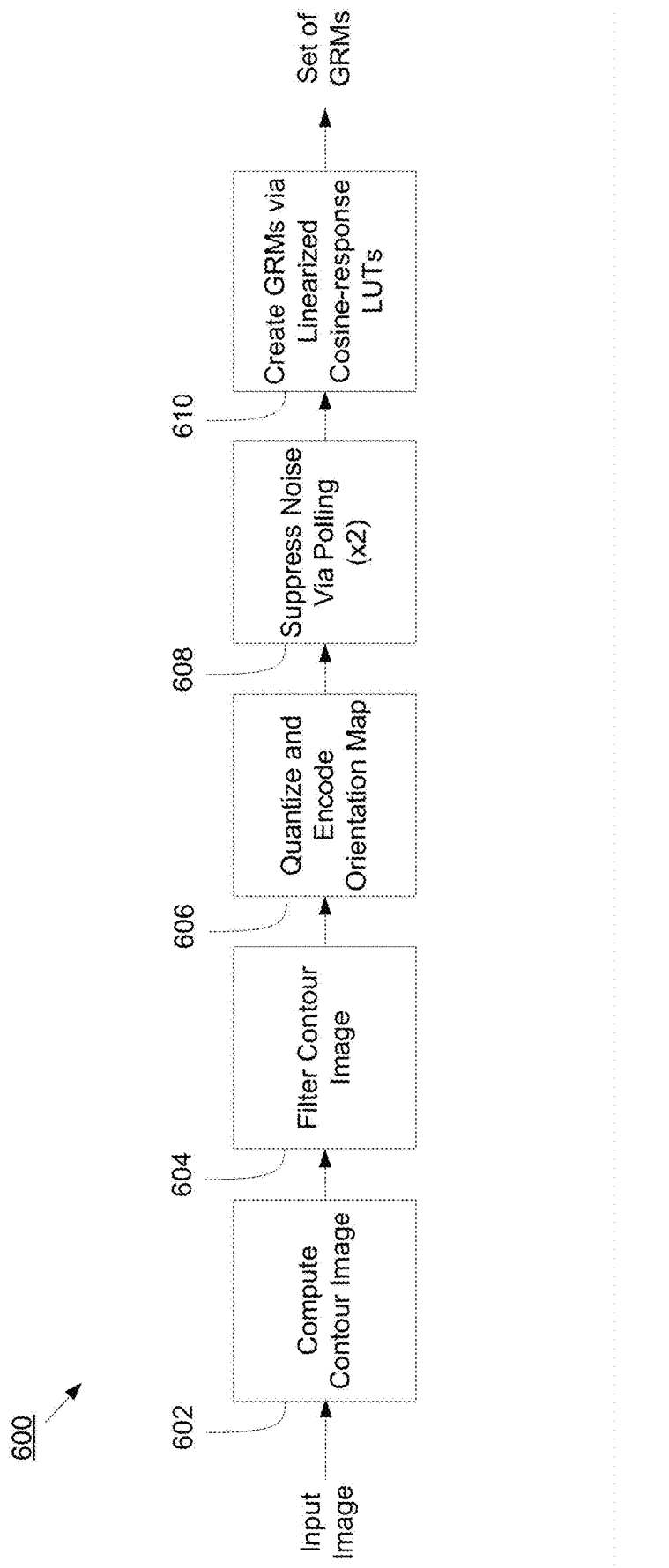
FIG. 6 is a flow diagram depicting an example of a modified Line2D gradient-response map method, according to some embodiments.

Referring to FIG. 6, there is shown a modified Line2D method 600 for implementing the generating pose candidate step 502. A Line2D method can be performed by the processor 414, and the instructions for a Line2D method may generally be stored in system memory (not shown).

A standard Line2D method can be considered to comprise a compute contour image step 602, a quantize and encode orientation map step 606, a suppress noise via polling step 608, and a create gradient-response maps (GRMs) via look-up tables (LUTs) step 610. In the method 600 as depicted, a filter contour image step 604 has been added as compared to the standard Line2D method. Furthermore, the suppress noise via polling step 608 and the create GRMs via LUTs step 610 have been modified as compared to the standard Line2D method.

The filter contour image step 604 converts the image to the frequency domain from the spatial domain, applies a high-pass Gaussian filter to the spectral component, and then converts the processed image back to the spatial domain. The filter contour image component 604 can reduce the presence of background textures in the image, such as grass and foliage.

The suppression of noise via polling step 608 is modified from a standard Line2D method by adding a second iteration of the process to the pipeline. In other words, polling can be performed twice instead of once, which can help reduce false positives in some circumstances.

The create GRMs via LUTs step 610 is modified from a standard Line2D method by redefining the values used in the LUTs. Whereas a standard Line2D method may use values that follow a cosine response, the values used in the LUTs in the modified component 610 follow a linear response.

Figure 7:
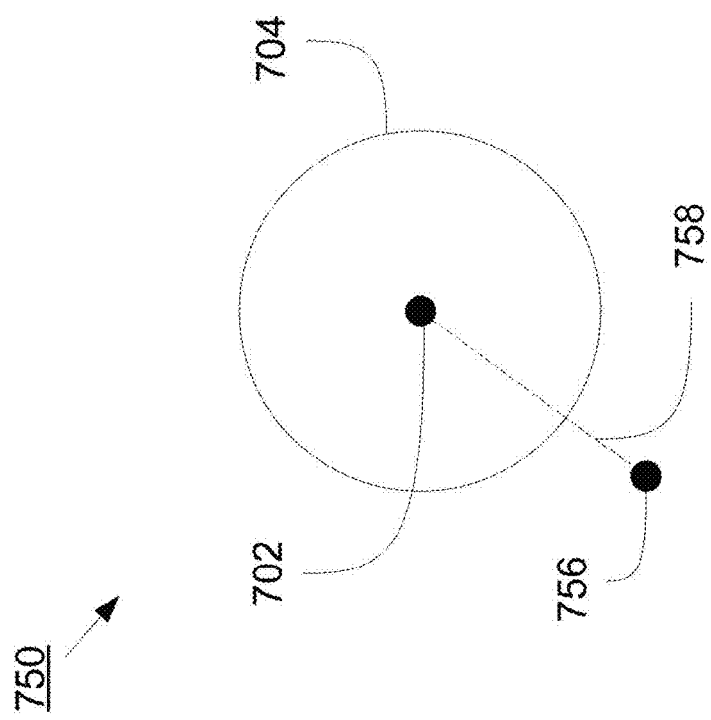
FIG. 7 is a pictorial representation of the verify candidate step of a method for detecting and locating a waste receptacle, according to some embodiments.
Figure 7:
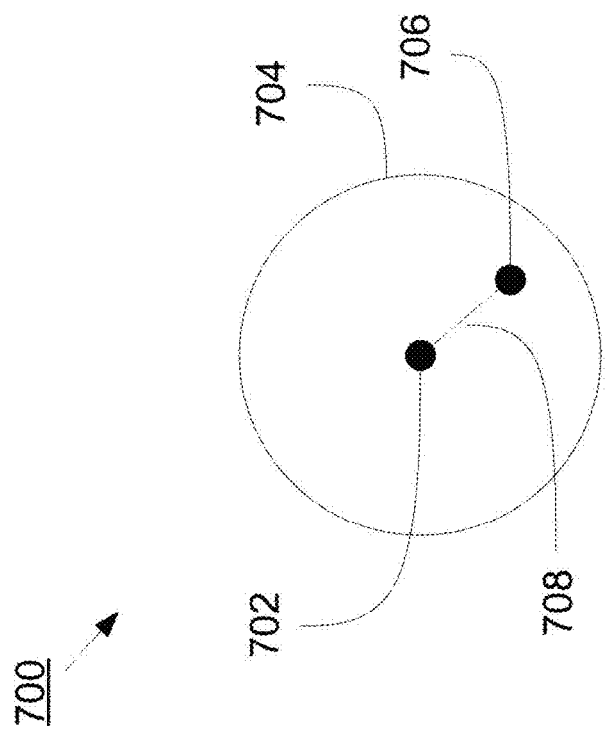

Referring to FIG. 7, there is shown a pictorial representation of the verify candidate step 508. Two examples are shown in FIG. 7. The first example 700 depicts a scenario in which a match is found between the HOG of the template representation and the HOG of the pose candidate. The second example 750 depicts a scenario in which a match is not found.

In each example 700 and 750, the HOG of a template representation 702 is depicted at the center of a circle that represents a pre-defined threshold 704.

Example 700 depicts a scenario in which the HOG of a pose candidate 706 is within the circle. In other words, the difference 708 (shown as a dashed line) between the HOG of the template representation 702 and the HOG of the pose candidate 706 is less than the pre-defined threshold 704. In this case, a match between the pose candidate and the template representation can be verified.

Example 750 depicts a scenario in which the HOG of a pose candidate 756 is outside the circle. In other words, the difference 758 between the HOG of the template representation 702 and the HOG of the pose candidate 756 is more than the pre-defined threshold 704. In this case, a match between the pose candidate and the template representation cannot be verified.

Referring again to FIG. 5, when a match between the pose candidate and the template representation has been verified at step 508, the method 500 proceeds to the extract pose step 514. This step exploits the pose metadata stored during the creation of the template representation of the waste receptacle. This step calculates the location of the waste receptacle (e.g., the angle and scale). The location of the waste receptacle can be calculated using the pose metadata, the intrinsic parameters of the camera (e.g., focal length, feature depth, etc.), and a pin-hole model.

Referring again to FIG. 4, once the location of the waste receptacle has been calculated, the arm-actuation module 106 can be used to move the arm 108 according to the calculated location of the waste receptacle. According to some embodiments, the processor 414 may be used to provide control instructions to the arm-actuation module 106. According to other embodiments, the control signals may be provided by another processor (not shown), including a processor that is integrated with arm-actuation module 106.

Figure 8:
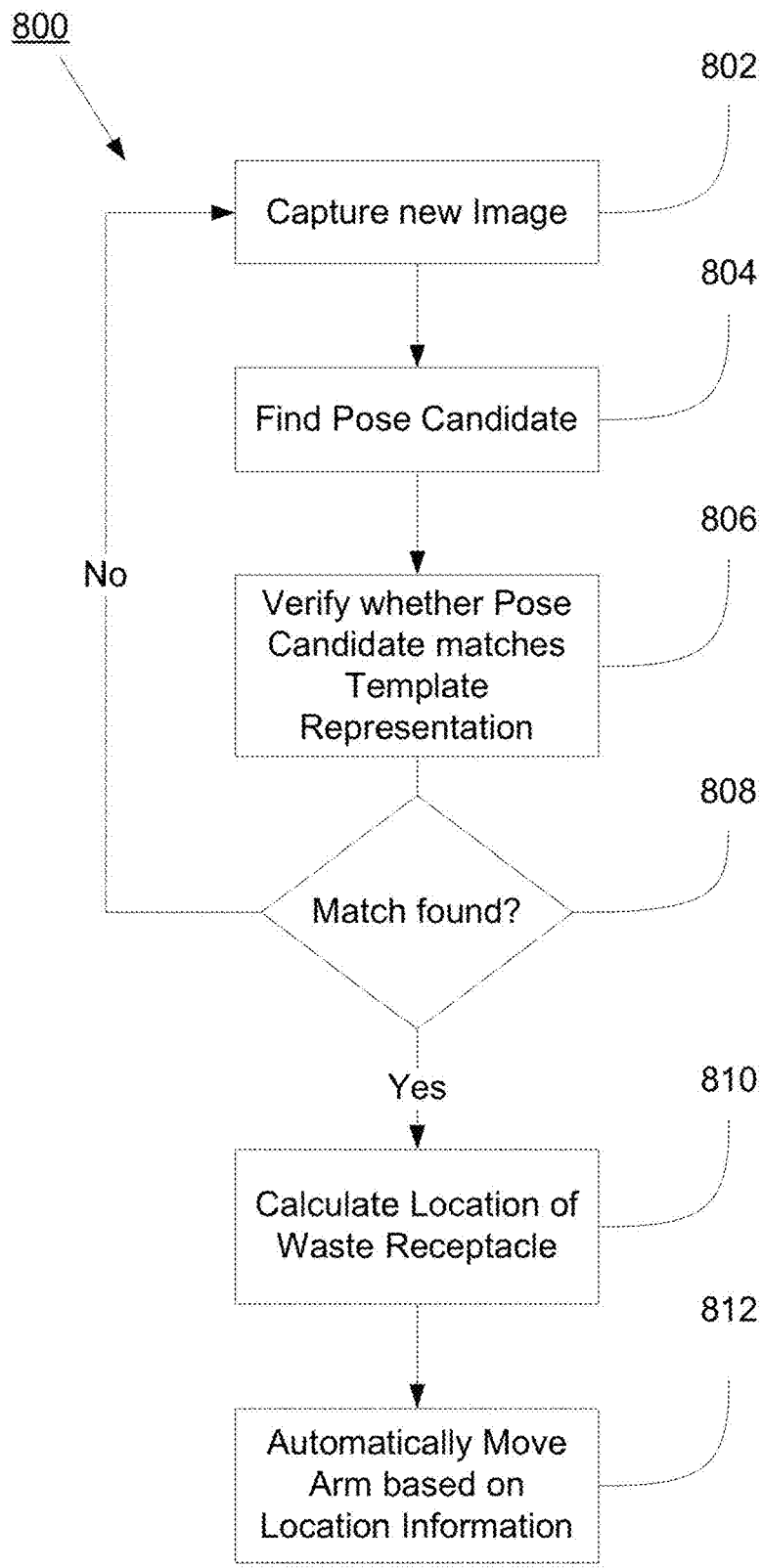
FIG. 8 is a flow diagram depicting a method for detecting and picking up a waste receptacle, according to some embodiments.

Referring to FIG. 8, there is shown a method for detecting and picking up a waste receptacle. The method begins at 802, when a new image is captured. For example, the new image may be captured by the camera 104, mounted on a waste-collection vehicle as it is driven along a path. According to some embodiments, the camera 104 may be a video camera, capturing real-time images at a particular frame rate.

At 804, the method finds a pose candidate based on the image. For example, the method may identify a waste receptacle in the image.

According to some embodiments, step 804 may include the steps of filtering the image and generating a set of gradient-response maps. For example, filtering the image may be accomplished by converting the image to the frequency domain, obtaining a spectral component of the image, applying a high-pass Gaussian filter to the spectral component, and then returning the image back to its spatial representation.

According to some embodiments, step 804 may include a noise suppression step. For example, noise can be suppressed via polling, and, in particular, superior noise-suppression results can be obtained by performing the polling twice (instead of once).

At 806, the method verifies whether the pose candidate matches the template representation. According to some embodiments, this is accomplished by comparing an HOG of the template representation with an HOG of the pose candidate. The difference between the HOG of the template representation and the HOG of the pose candidate can be compared to a pre-defined threshold such that, if the difference is below the threshold, then the method determines that a match has been found; and if the difference is above the threshold, then the method determines that a match has not been found.

At 808, the method queries whether a match between the pose candidate and the template representation during the previous step at 806. If a match is not found—i.e., if the waste receptacle (or other target object) was not found in the image—then the method returns to step 802, such that a new image is captured, and the method proceeds with the new image. If, on the other hand, a match is found, then the method proceeds to step 810.

At step 810, the location of the waste receptacle is calculated. According to some embodiments, the location can be determined based on the pose metadata stored in the matched template representation. For example, once a match has been determined at step 808, then, effectively, the waste receptacle (or other target object) has been found. Then, by querying the pose metadata associated with the matched template representation, the particular pose (e.g., the angle and scale or depth) can be determined.

At step 812, the arm 108 is automatically moved based on the location information. The arm may be moved via the arm-actuation module 106.

According to some embodiments, the arm 108 may be moved entirely automatically. In other words, the control system 410 may control the precise movements of the arm 108 necessary for the arm 108 to grasp the waste receptacle, lift the waste receptacle, dump the waste receptacle into the waste-collection vehicle, and then return the waste receptacle to its original position, without the need for human intervention.

According to other embodiments, the arm 108 may be moved automatically towards the waste receptacle, but without the precision necessary to move the waste receptacle entirely without human intervention. In such a case, the control system 410 may automatically move the arm 108 into sufficient proximity of the waste receptacle such that a human user is only required to control the arm 108 over a relatively short distance in order to grasp the waste receptacle. In other words, according to some embodiments, the control system 410 may move the arm 108 most of the way towards a waste receptacle by providing gross motor controls, and a human user (for example, using a joystick control), may only be required to provide fine motor controls.

Joystick Control System

Figure 9:
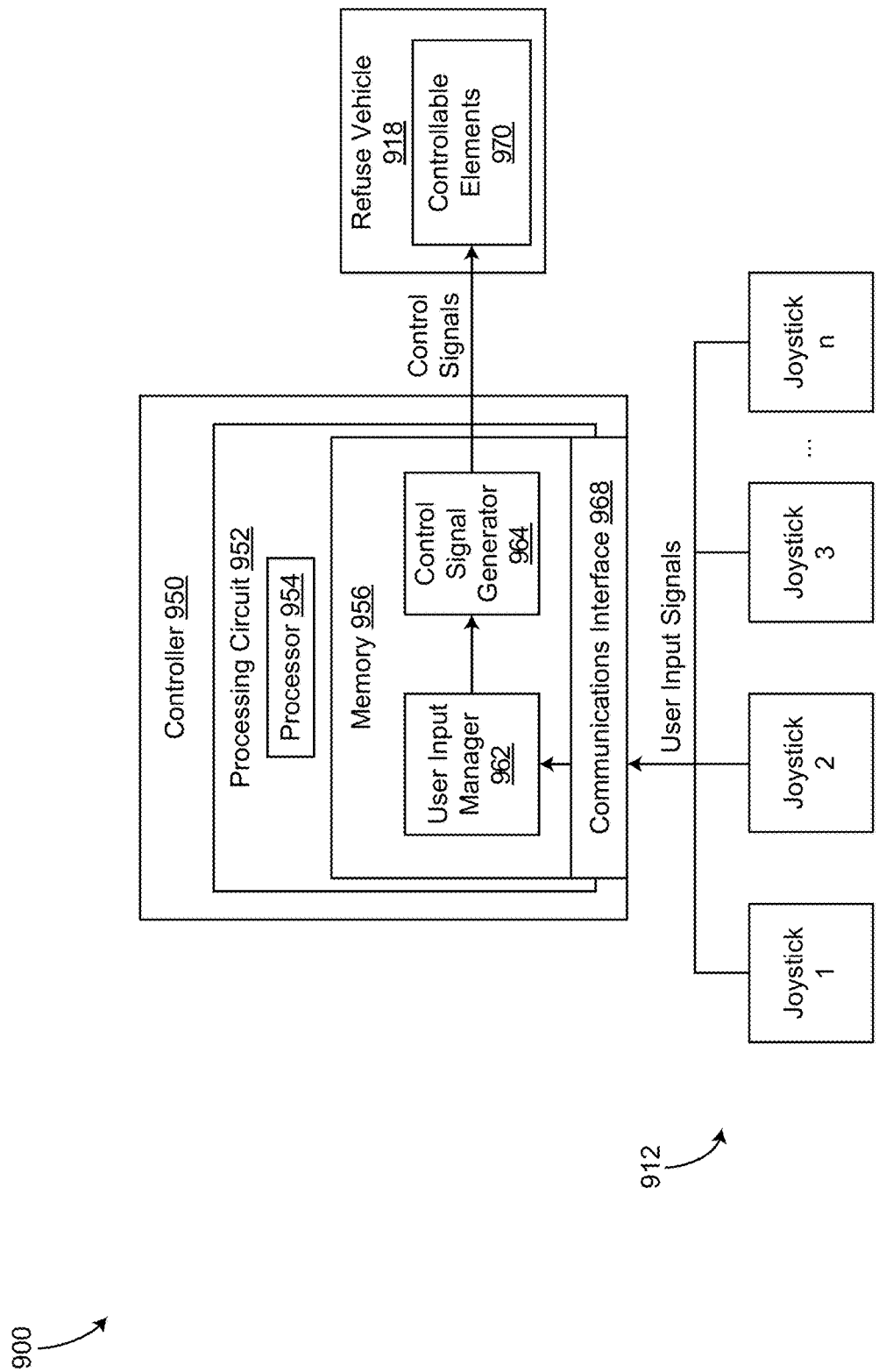
FIG. 9 is a block diagram of a joystick control system for a refuse vehicle, according to some embodiments.

Referring particularly to FIG. 9, a joystick control system 900 for a refuse vehicle 918 (e.g., waste-collection vehicle 102) is shown, according to some embodiments. Joystick control system 900 can be implemented on a front loading refuse vehicle, a rear loading refuse vehicle, a side loading refuse vehicle, or any other configured refuse vehicle. For example, joystick control system 900 can be implemented on a front loading refuse vehicle that includes an intermediate collection device.

Joystick control system 900 includes joysticks 912, controller 950, and controllable elements 970, according to some embodiments. Joysticks 912 can include any n number of joysticks (e.g., 2 joysticks, 1 joystick, 3 joysticks, etc.). In some embodiments, joysticks 912 includes two or more joystick input devices. Joysticks 912 can be any user input device that includes a stick or column that pivots relative to a base member and generates user input signals based on the pivoting/rotation of the stick relative to the base member. Any of joysticks 912 can include any additional buttons, switches, triggers, levers, dials, etc., configured to receive a user input. Joysticks 912 that include additional buttons, switches, triggers, levers, dials, etc., can provide user input signals to controller 950 based on actuation of the various buttons, switches, etc.

Controller 950 is configured to receive user input signals from joysticks 912 and generate and provide control signals to controllable elements 970. Controllable elements 970 can represent any device, system, element, etc., of refuse vehicle 918 that joystick control system 900 is configured to control. For example, controllable elements 970 can include loading arms, lift arms, articulated arms, a front loading control system, a side loading control system, an intermediate loading system, an intermediate carry can, etc., and any of the primary movers, actuators, etc., of the various devices, systems, subsystems, etc., (e.g., hydraulic pumps, hydraulic motors, electric motors, hydraulic cylinders, linear electric cylinders, etc.). Controllable elements 970 can be any devices, apparatuses, systems, subsystems, etc., for loading, lifting, compacting, etc., refuse bins or containers into a hopper or compartment of the refuse vehicle 918.

Each of joysticks 912 can be configured to operate any systems, subsystems, devices, operations of one or more systems, subsystems, etc., of the refuse vehicle 918. For example, joystick 1 can be configured to operate an intermediate loading system (e.g., an intermediate carry can), while joystick 2 may be configured to operate the main loading system (e.g., front loading arms) of the refuse vehicle 918. In further example, rotation/pivoting of the stick of joystick 1 about a first axis or in a first direction can operate a first operation of the intermediate loading system, while rotation/pivoting of the stick of joystick 1 about a second axis or in a second direction can operate another operation of the intermediate loading system (or of the main loading system).

Controller 950 can include a communications interface 968. Communications interface 968 may facilitate communications between controller 950 and external systems, devices, sensors, etc. (e.g., controllable elements 970, joysticks 912, etc.) for allowing user control, monitoring, and adjustment to any of the communicably connected devices, sensors, systems, primary movers, etc. Communications interface 968 may also facilitate communications between controller 950 and a human machine interface. Communications interface 968 may facilitate communications between controller 950 and joysticks 912.

Communications interface 968 can be or include wired or wireless communications interfaces (e.g., jacks, antennas, transmitters, receivers, transceivers, wire terminals, etc.) for conducting data communications with sensors, devices, systems, joysticks, etc., of joystick control system 900 or other external systems or devices (e.g., a user interface, an engine control unit, etc.). In various embodiments, communications via communications interface 968 can be direct (e.g., local wired or wireless communications) or via a communications network (e.g., a WAN, the Internet, a cellular network, etc.). For example, communications interface 968 can include an Ethernet card and port for sending and receiving data via an Ethernet-based communications link or network. In another example, communications interface 968 can include a Wi-Fi transceiver for communicating via a wireless communications network. In some embodiments, the communications interface is or includes a power line communications interface. In other embodiments, the communications interface is or includes an Ethernet interface, a USB interface, a serial communications interface, a parallel communications interface, etc.

Communications interface 968 can be configured to serially communicate with any of the n number of joysticks 912. In some embodiments, communications interface 968 includes a separate serial communications port for each of the n joysticks 912. For example, communications interface 968 can include n number of USB ports (or Ethernet ports, or any other serial or parallel communications port) configured to communicably couple controller 950 with joysticks 912.

Controller 950 includes a processing circuit 952, a processor 954, and memory 956, according to some embodiments. Processing circuit 952 can be communicably connected to communications interface 968 such that processing circuit 952 and the various components thereof can send and receive data via the communications interface. Processor 954 can be implemented as a general purpose processor, an application specific integrated circuit (ASIC), one or more field programmable gate arrays (FPGAs), a group of processing components, or other suitable electronic processing components.

Memory 956 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 956 can be or include volatile memory or non-volatile memory. Memory 956 can include database components, object code components, script components, or any other type of information structure for supporting the various activities and information structures described in the present application. According to some embodiments, memory 956 is communicably connected to processor 954 via processing circuit 952 and includes computer code for executing (e.g., by processing circuit 952 and/or processor 954) one or more processes described herein.

Referring still to FIG. 9, memory 956 can include a user input manager 962, and a control signal generator 964. User input manager 962 can receive any user input signals (e.g., Controller Area Network (CAN) signals) from joysticks 912 through communications interface 968. User input manager 962 can store information about each of joysticks 912 and their respective operations. For example, user input manager 962 can store information regarding joystick 1, and which devices, systems, subsystems, operations, etc., of controllable elements 970 correspond to joystick 1. Likewise, user input manager 962 can store information regarding any of the n joysticks 912 and the various systems, subsystems, devices, operations, etc., associated with each of the n joysticks 912. In some embodiments, user input manager 962 stores a mapping (e.g., a table, a set of instructions, a database, etc.) that maps the various joysticks 912 with their respective systems, subsystems, devices, operations, etc. User input manager 962 can analyze any of the received CAN user input signals received from joysticks 912 to identify which of joysticks 912 the CAN user input signals are received from (e.g., identifying a CAN address of each of joysticks 912).

User input manager 962 can provide control signal generator 964 with an indication regarding the user input signals and an identification regarding which of the n joysticks 912 produces the user input signal. For example, user input manager 962 can provide control signal generator 964 with the user input signals and the identification regarding which joystick 912 the user input signals were generated by, as well as an indication regarding the associated systems, devices, subsystems, operations, functions, etc., of controllable elements 970 for the particular joystick 912.

Control signal generator 964 can receive the user input signals from user input manager 962, the identified joystick 912 that generated the user input signals, and which devices, collections of devices, systems, subsystems, etc., of controllable elements 970 that correspond to the identified joystick 912. Control signal generator 964 is configured to generate control signals for the various controllable elements 970 that correspond to joysticks 912. Control signal generator 964 can receive the mapped functions, devices, subsystems, systems, etc., of the user input signals from user input manager 962 and generate control signals for the appropriate controllable elements 970 based on the user input signals received from user input manager 962.

For example, joystick 1 can be configured to operate the intermediate lift apparatus/system, while joystick 2 is configured to operate the main lift apparatus/system. An operator can pivot or operate joystick 1 to generate user input signals. The user inputs signals are provided to controller 950 through communications interface 968. Specifically, the user input signals are provided to user input manager 962. User input manager 962 can receive the user input signals from joystick 1 through communications interface 968 and identify which of joysticks 912 generated the user input signals. User input manager 962 can identify that the user input signals are received through a particular communications port and can identify that joystick 1 generated the user input signals based on the particular communications port the user input signals are received through and using the mapping. In some embodiments, user input manager 962 analyzes the received signals to identify which of joysticks 912 generated the user input signals. User input manager 962 can provide the user input signals and/or the requested operations to control signal generator 964. Control signal generator 964 then uses the identified joystick (e.g., joystick 1) and the associated operations, systems, devices, subsystems, etc., to operate controllable elements 970 to perform the operation requested by the operator.

Other control systems for refuse vehicles include a controller that corresponds to each joystick. For example, in such control systems, if three joysticks are implemented to operate various controllable elements of the refuse vehicle, three separate computers are used. Some control systems use a single joystick with a switch to change what signals the joystick sends to the computer. To be properly configured to control refuse vehicles with various systems of controllable elements (e.g., lifting apparatuses, articulated arms, intermediate lift devices, loading devices, loading systems, etc.), these control systems require additional modification (e.g., either additional computers or additional switches).

Advantageously, joystick control system 900 can be used for refuse/garbage collection vehicles with various uses, configurations, and/or applications. Joystick control system 900 is a single, unitary system, with a single controller 950 that can accommodate for the various use cases, configurations, and/or applications. Joystick control system 900 can save time, reduce errors, and therefore save costs associated with operating the refuse vehicle 918 and installing or modifying the refuse vehicle's control system. For example, joystick control system 900 can be used for a front end loader refuse collection vehicle. Front end loader refuse collection vehicles can have multi-use/multi-configurations, can be configured for residential refuse collection, or commercial refuse collection, or both. Front end loader refuse collection vehicles can also be used for recycling collection, garbage collection, organic waste collection, etc. Accordingly, there are many different attachments, systems, subsystems, apparatuses, configurations, etc., of front end loader refuse collection vehicles. In this case, joystick control system 900 can be used with various joysticks 912 to operate the various systems, apparatuses, sub-systems, etc., of the variously configured front end loader refuse vehicles. It should be understood, however, that joystick control system 900 can be used for any refuse collection vehicle and is not limited to only front end loader refuse collection vehicles.

Advantageously, joystick control system 900 provides a versatile control system that can be easily modified, installed, and operated to control a refuse vehicle 918. Other control systems cannot be as easily modified, and require replacement or addition of computers, switches, etc. Joystick control system 900 facilitates addition and removal of joysticks 912 to suit the specific configuration of the refuse vehicle 918. Other refuse collection vehicle control systems do not provide this advantage. Joystick control system 900 advantageously does not require additional computers for additional joysticks and provides a more cost-effective and versatile control system.

Figure 10:
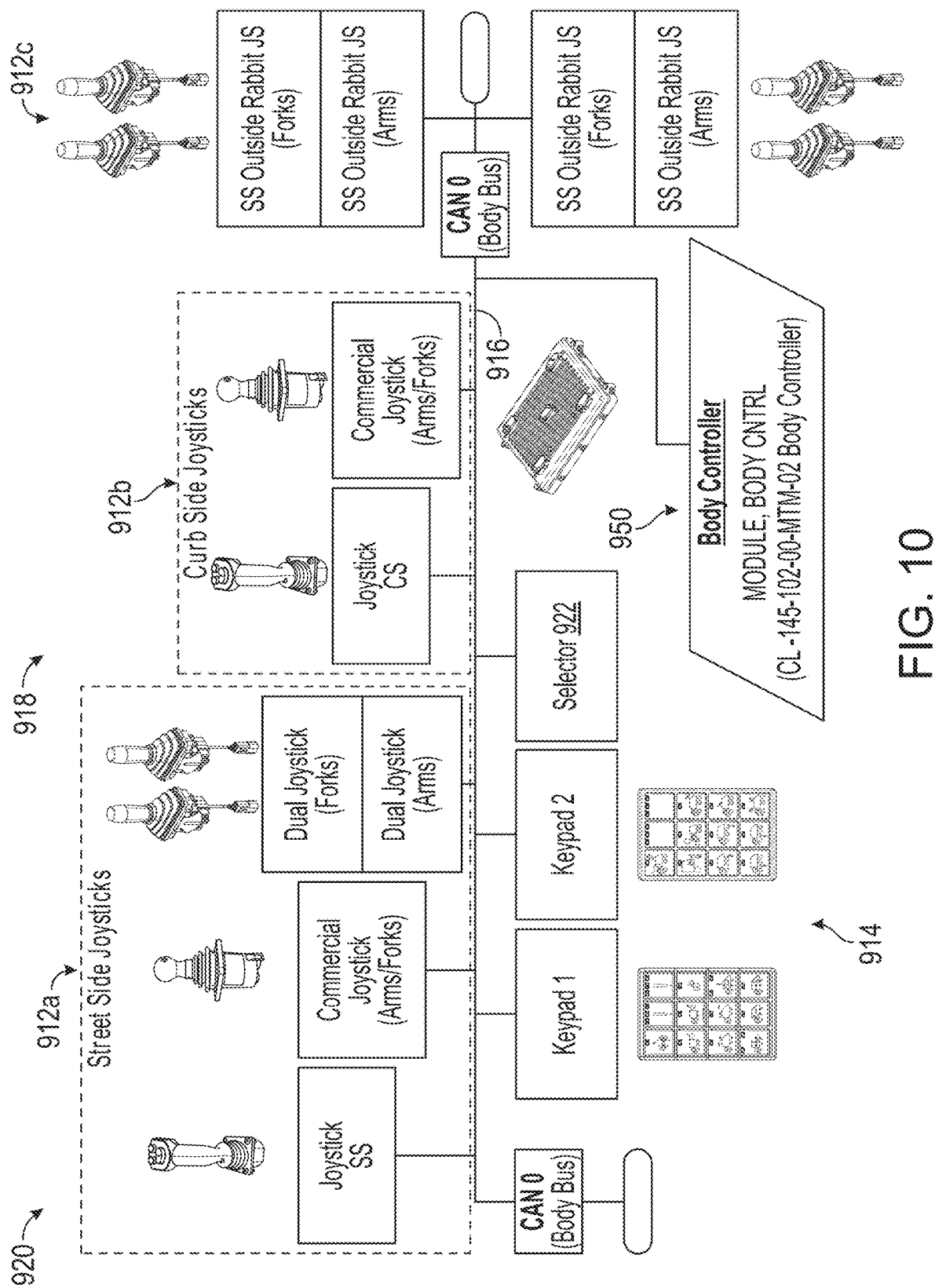
FIG. 10 is a block diagram of a joystick control system for a refuse vehicle, according to some embodiments.

Referring now to FIG. 10, a joystick control system 920 includes a first joystick group 912a, a second joystick group 912b, and a third joystick group 912c. Joystick control system 920 can be the same as or similar to joystick control system 900. For example, joystick control system 920 includes controller 950 that can be configured to perform any of the analysis, control, etc., as controller 950 of joystick control system 900 described in greater detail above with reference to FIG. 9.

Joystick groups 912a-912c can each include any number of a variety of joysticks (e.g., one joystick, a plurality of joysticks, etc.). For example, joystick groups 912a-912c can include commercial joysticks configured to operate various controllable elements (e.g., arms/forks) of the refuse vehicle 918. Joystick group 912a includes street-side joysticks configured to operate an apparatus of the refuse vehicle 918 (shown as controllable elements 970). Joystick group 912a can be a group of joysticks that are positioned on a street-side of the refuse vehicle 918. Joystick group 912b includes curbside joysticks (e.g., positioned on a curb-side of the refuse vehicle 918) configured to operate the apparatus of the refuse vehicle 918. Joystick group 912c includes both street side and curbside joysticks configured to operate various apparatuses of the refuse vehicle 918.

Referring still to FIG. 10, joystick control system 920 includes a keypad group 914 and a selector 922. Keypad group 914 includes one or more keypads configured to receive a user input to transition the refuse vehicle 918 between various modes of operation. In some embodiments, controller 950 adjusts an operation of controllable elements 970 differently based on a selected mode indicated by the operator through any of the keypads. Each of the keypads can include a plurality of buttons that an operator can press to transition the refuse vehicle 918 between various predetermined/predefined modes of operation.

In some embodiments, selector 922 is transitionable between a first position and a second position to activate or deactivate various of joystick groups 912a-912c. For example, when selector 922 is transitioned into the first position, joystick group 912a may be configured to operate the apparatus of refuse vehicle 918 (shown as controllable elements 970 in FIG. 9). Likewise, when selector 922 is transitioned into the second position, joystick group 912b may be configured to operate the apparatus of refuse vehicle 918 (shown as controllable elements 970 in FIG. 9). In this way, operation of selector 922 may activate or deactivate joystick group 912a, joystick group 912b, and/or joystick group 912c.

Controller 950 is configured to communicably connect with any of joystick groups 912a-912c, keypad group 914, and controllable elements 970 through a Controlled Area Network (CAN) bus 916. In some embodiments, controller 950, joystick groups 912a-912c, keypad group 914, and controllable elements 970 are wiredly connected with CAN bus 916. In some embodiments, CAN bus 916 also facilitates communications between various devices, sensors, systems, subsystems, etc., of the refuse vehicle 918.

Figure 11:
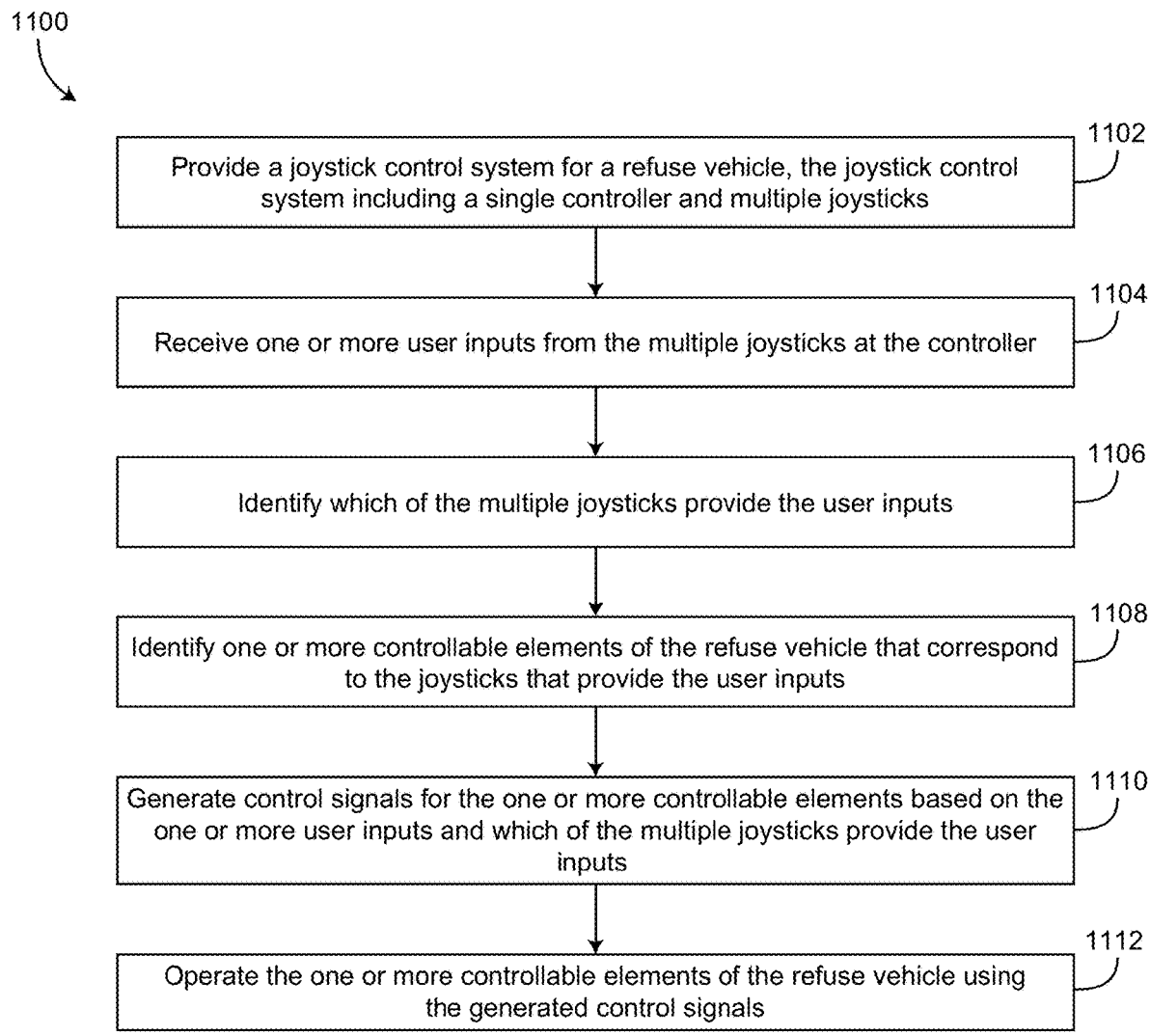
FIG. 11 is a flow diagram of a process for operating multiple controllable elements of a refuse vehicle with multiple joysticks and a single controller, according to some embodiments.

Referring particularly to FIG. 11, a process 1100 can be performed (e.g., using controller 950) to provide a user-centric control system for a refuse vehicle. Process 1100 can be performed so that a refuse vehicle which has multiple controllable elements (e.g., systems, sub-systems, devices, articulating arms, boom arms, loading mechanisms, etc.), and multiple joysticks or input devices that are configured to operate the various controllable elements use a single controller, thereby simplifying a control scheme or control system for the multiple joysticks and the multiple controllable elements.

Process 1100 includes providing a joystick control system for a refuse vehicle, the joystick control system including a single controller and multiple joysticks (step 1102), according to some embodiments. In some embodiments, the multiple joysticks are each configured to operate a different controllable element or controllable system of the refuse vehicle. The multiple joysticks may be positioned within a cab of the refuse vehicle so that an operator may provide user inputs to the controller by the joysticks. The joysticks can each be communicably coupled with the controller through a wired connection or a wireless connection. The controller can be a single processing unit, a single processor, a processing circuit, etc. The controller may be controller 950. The multiple joysticks may be joystick groups 912a-912c.

Process 1100 includes receiving one or more user inputs from the multiple joysticks at the controller (step 1104), according to some embodiments. In some embodiments, the user inputs are provided by an operator of the refuse vehicle by adjusting or moving the joysticks. The adjustment of the joysticks may generate a signal (the user input) that is transferred from each of the joysticks to the controller.

Process 1100 includes identifying which of the multiple joysticks provide the user inputs (step 1106), according to some embodiments. In some embodiments, step 1106 is performed by controller 950. The controller may receive multiple user inputs (e.g., the signals generated by the adjustment of the joysticks) at once. For example, the controller may receive a first user input signal $u_1$, a second user input signal $u_2$, a third user input signal $u_3$, etc. The controller can receive any n number of user input signals, depending on a number of the joysticks, and which of the multiple joysticks are adjusted or operated to provide a user input to the controller. The controller may identify which user input signal is provided from which joystick by analyzing an identifier, a type of signal, a serial number, etc., that is provided with the user input signals u. In some embodiments, the controller can identify which of the multiple joysticks provide the user input signals by identifying which of multiple connection ports or connection interfaces each user input signal is received. For example, the controller may include a mapping between a particular port, connection interface, etc., and a controllable element, or a system of the refuse vehicle.

Process 1100 includes identifying one or more controllable elements of the refuse vehicle that correspond to the joysticks that provide the user inputs or provide the user input signals (step 1108), according to some embodiments. In some embodiments, step 1108 includes using a mapping between each joystick and a corresponding controllable element, or system or actuator of the refuse vehicle. For example, the controller may identify that the first joystick corresponds to a first controllable element, the second joystick corresponds to a second controllable element, the third joystick corresponds to a controllable system, etc. Step 1108 can be performed by user input manager 962.

Process 1100 includes generating control signals for the one or more controllable elements based on the one or more user inputs and which of the multiple joysticks provide the user inputs (step 1110), according to some embodiments. Step 1110 can be performed by control signal generator 964 using any of the functionality as described in greater detail above with reference to FIG. 9. Step 1110 can be performed by generating control signals for controllable elements 970 based on the user inputs or user inputs signals and a control scheme. The control signals generated for each controllable element can be unique for each controllable element. For example, the control signals for an articulated arm of the refuse vehicle may be different than the control signals for a crusher or compacter of the refuse vehicle.

Process 1100 includes operating the one or more controllable elements of the refuse vehicle using the generate control signals (step 1112), according to some embodiments. The controller may provide the unique control signals to each of the identified controllable elements 970 so that the controllable elements (e.g., actuators, motors, pump systems, valves, etc.) operate to perform functions as requested by the user inputs.

Advantageously, process 1100 can be performed to provide a control or joystick or user input device system that includes multiple user input devices which each control an operation of a corresponding one of multiple controllable elements, but with a single controller. This may reduce costs associated with installing multiple controllers for each joystick or user input device (as other control systems do), and facilitates a simplified control system for a refuse vehicle.

Warning System

Figure 12:
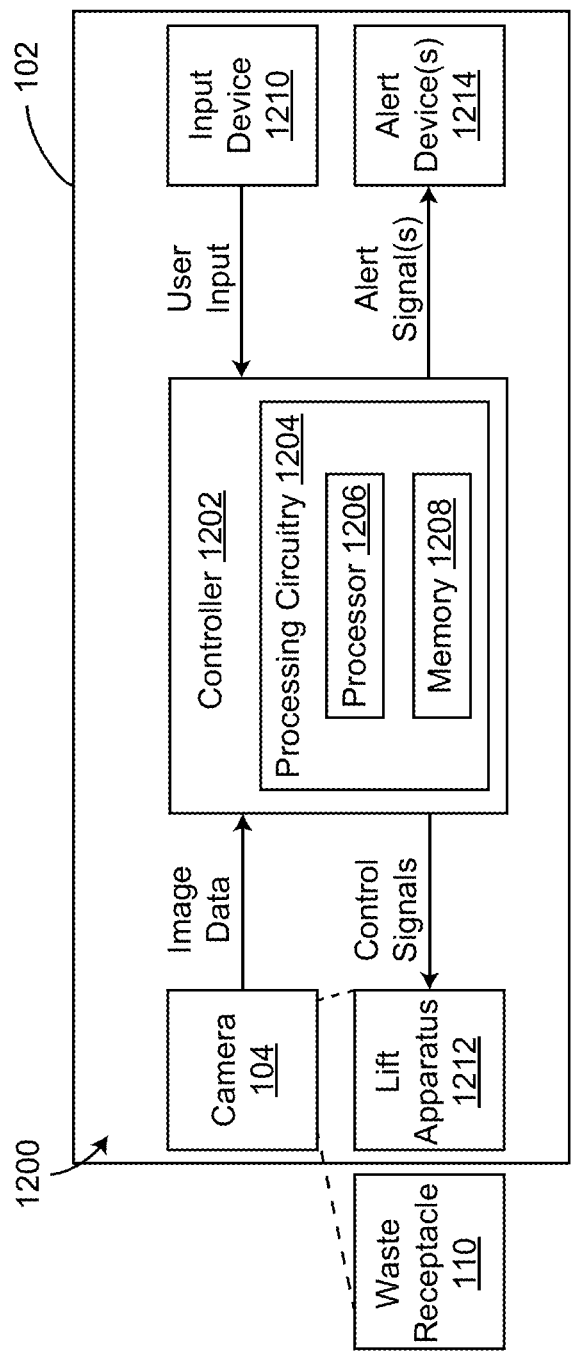
FIG. 12 is a block diagram of an alignment and warning system for a refuse vehicle, according to some embodiments.
Figure 13:
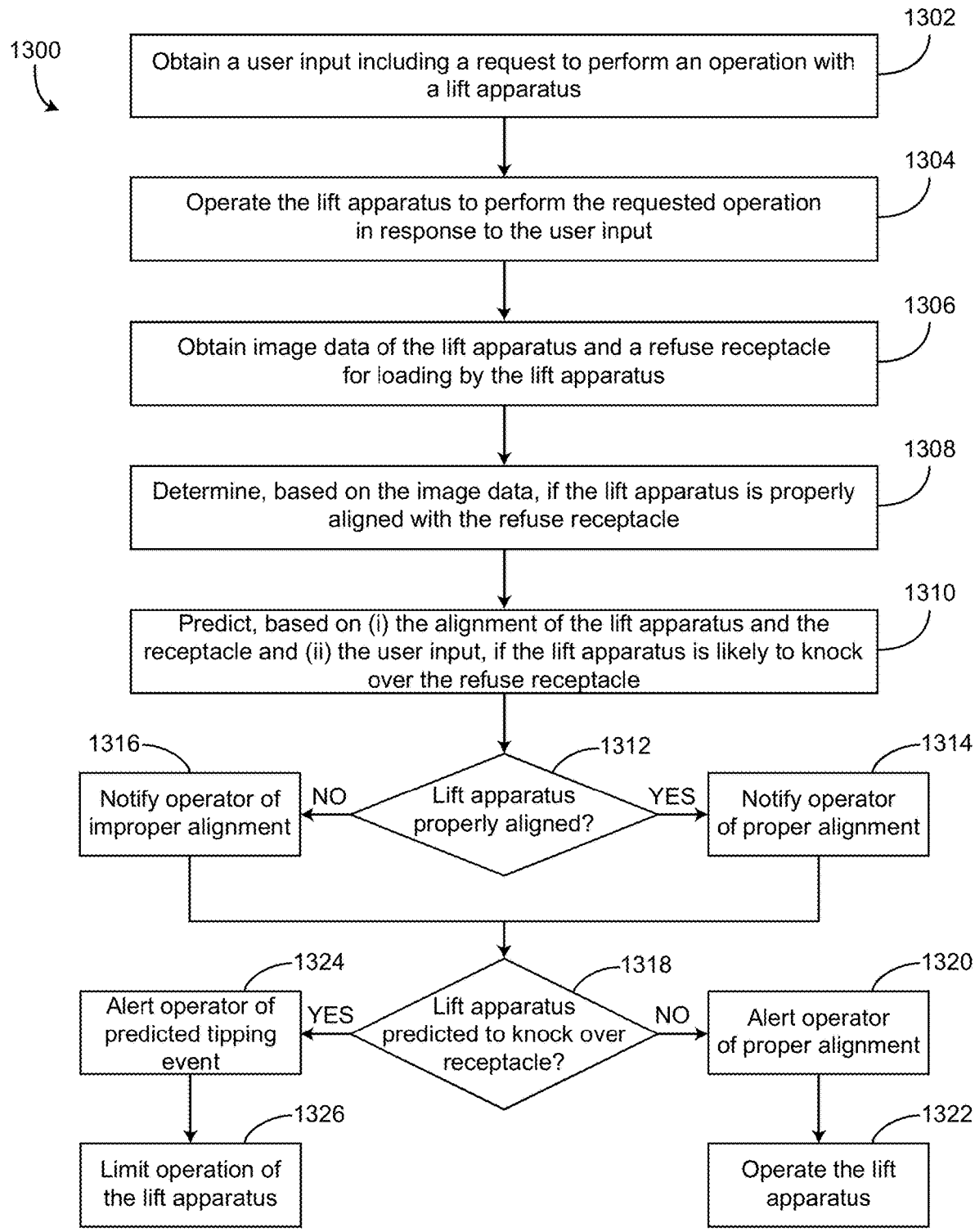
FIG. 13 is a flow diagram of a process for detecting alignment between a lift apparatus of a refuse vehicle and a target refuse receptacle, according to some embodiments.

Referring to FIGS. 12 and 13, the waste-collection vehicle 102 includes a detection and alert system 1200 that is configured to monitor alignment between a lift apparatus 1212 and the waste receptacle 110. The detection and alert system 1200 includes a controller 1202, the camera 104, the lift apparatus 1212, one or more input devices 1210, and one or more alert devices 1214. The detection and alert system 1200 is configured to obtain image data of the lift apparatus 1212 and the waste receptacle 110 from the camera 104 and perform image analysis of the lift apparatus 1212 and the waste receptacle 110 to identify a relative alignment between the lift apparatus 1212 (e.g., a grabber of the lift apparatus 1212, the grasping mechanism 112, forks of a front end loading lift apparatus, articulated arms, etc.) and the waste receptacle 110 or a portion of the waste receptacle 110 (e.g., engagement portions of the waste receptacle 110, apertures or openings of the waste receptacle 110, etc.).

The controller 1202 includes processing circuitry 1204, a processor 1206, and memory 1208, according to some embodiments. Processing circuitry 1204 can be communicably connected to a communications interface such that processing circuitry 1204 and the various components thereof can send and receive data via the communications interface. Processor 1206 can be implemented as a general purpose processor, an application specific integrated circuit (ASIC), one or more field programmable gate arrays (FPGAs), a group of processing components, or other suitable electronic processing components.

Memory 1208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1208 can be or include volatile memory or non-volatile memory. Memory 1208 can include database components, object code components, script components, or any other type of information structure for supporting the various activities and information structures described in the present application. According to some embodiments, memory 1208 is communicably connected to processor 1206 via processing circuitry 1204 and includes computer code for executing (e.g., by processing circuitry 1204 and/or processor 1206) one or more processes described herein.

The controller 1202 may be configured to obtain the image data from the camera 104, and perform any of the image analysis techniques described in greater detail above with reference to FIGS. 1-8 in order to identify, determine, or calculate relative positioning, orientation, or alignment between the lift apparatus 1212 (or a particular portion of the lift apparatus 1212 such as an arm or grabber) and the waste receptacle 110.

The controller 1202 is configured to obtain user inputs from the input device 1210, and use the user inputs to operate the lift apparatus 1212. In some embodiments, the input device 1210 is one of the joysticks 912. The controller 1202 can be configured to perform any of the functionality of the controller 950 as described in greater detail above with reference to FIGS. 9-11. In some embodiments, the controller 1202 is communicably coupled on the CAN bus 916 similarly to the controller 950. In some embodiments, the input device 1210 includes multiple joysticks 912 that are selectably operable to control operation of street side or curb side apparatuses.

In response to obtaining the user input from the input device 1210 (e.g., a command to operate the lift apparatus 1212 such as extending an arm from a side of the waste-collection vehicle 102, etc.), the controller 1202 may use results of the image analysis technique performed based on the image data to identify or predict if the lift apparatus 1212 will knock over, or push the waste receptacle undesirably if the lift apparatus 1212 performs the requested operation. For example, if the lift apparatus 1212 is or includes a grabber, having a specific zone that the waste receptacle 110 must be positioned within in order to be properly grasped by the grabber, the controller 1202 can use the image data or results of the image analysis (e.g., the relative alignment or positioning between the grabber and the waste receptacle 110) and the user input (e.g., the predicted or projected motion of the lift apparatus 1212 or the grabber) to determine if the waste receptacle 110 will be properly grasped or knocked over. If the operation of the lift apparatus 1212 as requested or commanded by the user input is not predicted to knock over the waste receptacle 110, the controller 1202 may operate the lift apparatus 1212 to perform the requested or commanded operation. If the operation of the lift apparatus 1212 is predicted to knock over the waste receptacle 110 (or the waste receptacle 110 and the lift apparatus 1212 are not positioned correctly relative to each other), the controller 1202 is configured to operate the alert device 1214, and/or limit operation of the lift apparatus 1212 from performing the requested or commanded operation until the user operates the waste-collection vehicle 102 so that the waste receptacle 110 and the lift apparatus 1212 are properly aligned.

Figure 14:
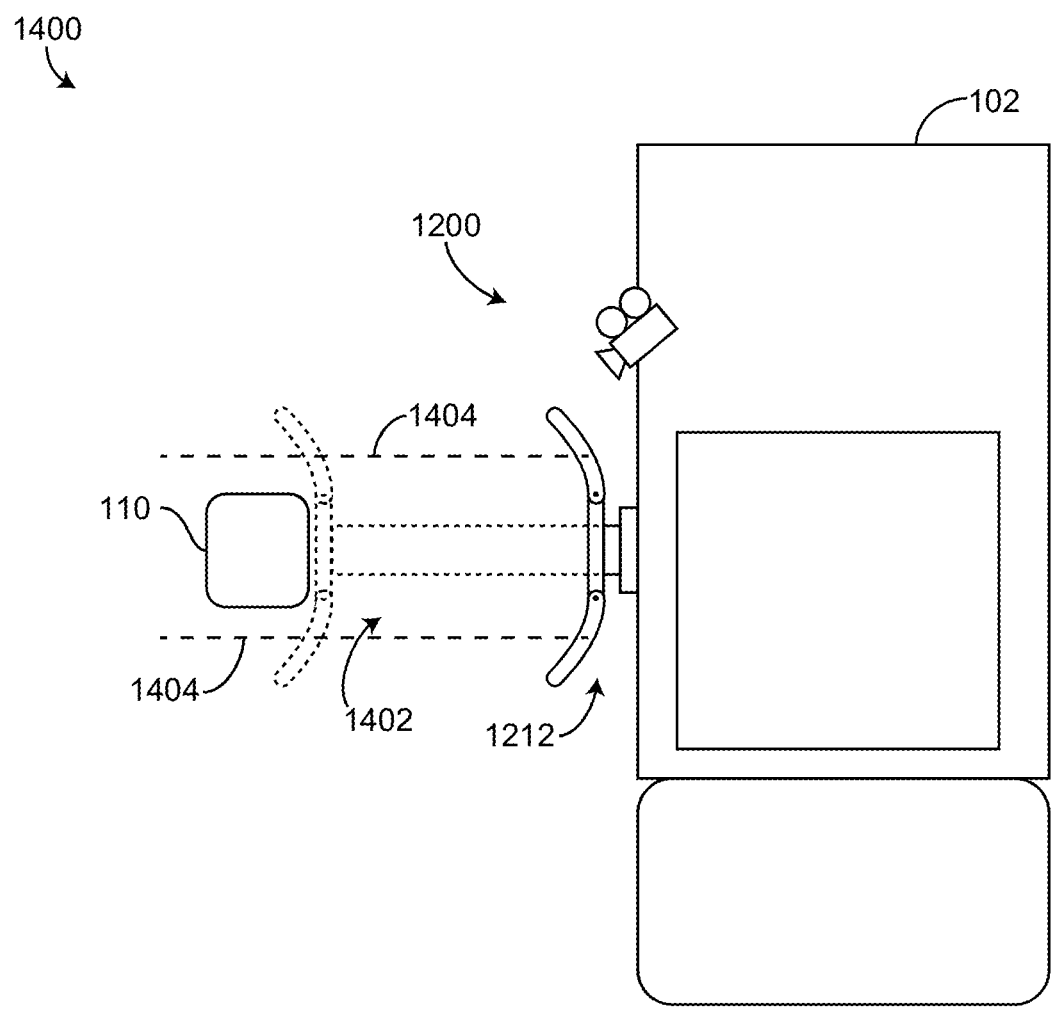
FIG. 14 is a diagram of a refuse vehicle including a lift apparatus and a target refuse receptacle that is properly aligned with the lift apparatus, according to some embodiments.

Referring particularly to FIG. 14, a diagram 1400 illustrates a case when the waste receptacle 110 and the lift apparatus 1212 are properly aligned with each other such that operation of the lift apparatus 1212 is not predicted to tip over, or push the waste receptacle 110. The diagram 1400 illustrate the waste-collection vehicle 102 as a side-loading refuse vehicle with a zero radius lift assembly and grabber, shown as the lift apparatus 1212. The lift apparatus 1212 may be configured to extend in a lateral direction from a side of the waste-collection vehicle 102 towards the waste receptacle 110, grasp the waste receptacle 110 using a pair of grabber arms or fingers, retract towards the waste-collection vehicle 102, and lift and empty the waste receptacle 110 into a body of the waste-collection vehicle 102 (e.g., into a hopper of the waste-collection vehicle 102, an inner volume, etc.).

FIG. 14 illustrates a zone 1402 (e.g., an area, multiple locations, etc.) that the lift apparatus 1212 operates (e.g., moves, extends, etc.) through. In some embodiments, the zone 1402 includes boundaries 1404 that define the zone 1402. The zone 1402 may be defined as fixed or stationary relative to a lateral side of the waste-collection vehicle 102, and may extend laterally from the lateral side of the waste-collection vehicle 102. The zone 1402 may define an area that, when the waste receptacle 110 is entirely positioned within the area (e.g., between the boundaries 1404), the waste receptacle 110 can be properly loaded by the lift apparatus 1212 without knocking the waste receptacle 110 over. In some embodiments, the camera 104 is fixedly coupled, mounted, secured, etc., so that the camera 104 is configured to obtain image data of the lateral side of the waste-collection vehicle 102 that the lift apparatus 1212 is positioned.

The controller 1202 is configured to obtain image data from the camera 104, and determine if the waste receptacle 110 is within the zone 1402 (e.g., positioned within the boundaries 1404). If the waste receptacle 110 is positioned within the zone 1402 (e.g., positioned between the boundaries 1404), the controller 1202 may operate the lift apparatus 1212 to empty contents of the waste receptacle 110 into the waste-collection vehicle 102, responsive to a user input or command requesting operation of the lift apparatus 1212.

Figure 15:
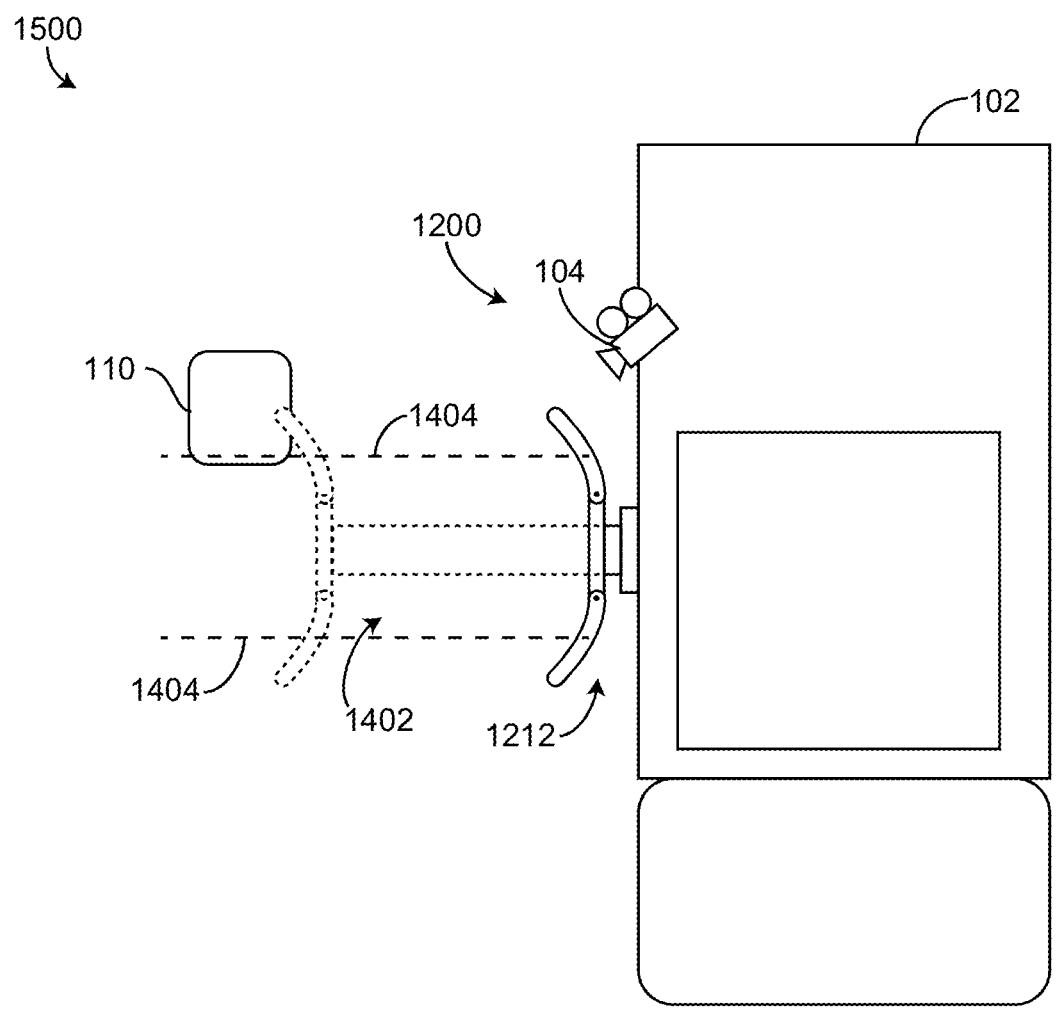
FIG. 15 is a diagram of a refuse vehicle including a lift apparatus and a target refuse receptacle that is improperly aligned with the lift apparatus, according to some embodiments.

Referring particularly to FIG. 15, a diagram 1500 illustrates a case when the waste receptacle 110 and the lift apparatus 1212 are not properly aligned with each other such that operation of the lift apparatus 1212 is predicted to tip over or push the waste receptacle 110 or is likely to tip over or push the waste receptacle 110. As shown in FIG. 15, the waste receptacle 110 is partially within the zone 1402 (e.g., extends or intersects with one of the boundaries 1404)

It should be understood that while the zone 1402 as shown herein with reference to FIGS. 14-15 is two-dimensional, the zone 1402 may be a three-dimensional zone (e.g., including a vertical height component). Any of the techniques described herein with reference to the controller 1202 using the positioning of the waste receptacle 110 relative to the lift apparatus 1212 may be applicable in three dimensions (e.g., if the lift apparatus 1212 is too high and will generate a tipping moment on the waste receptacle 110 when operated). Similarly, while the FIGURES generally show a side loading waste collection vehicle, the techniques described herein can also be applied to a front loader, a rear loader, a telehandler, an implement assembly, a skid steer, etc. The user input can be a command or request to extend the lift apparatus 1212 laterally, retract the lift apparatus 1212 laterally, pivot or rotate a portion of the lift apparatus 1212, operate a grabber of the lift apparatus 1212, raise or lower the lift apparatus 1212, etc. In some embodiments, the user input is obtained from a joystick and the controller 1202 is configured to use any of the techniques described herein to predict if the requested or commanded operation will tip or knock over the waste receptacle 110. In some embodiments, the controller 1202 uses a physics based model of the waste receptacle 110 to calculate tipping or rotational moments that will be applied to the waste receptacle 110 due to operation of the lift apparatus 1212 according to the user input. The controller 1202 can determine if the calculated tipping or rotational moments exceed a threshold and therefore are predicted to cause the waste receptacle 110 to tip over. In some embodiments, the controller 1202 uses a predetermined threshold. In some embodiments, the controller 1202 selects or determines the threshold of the tipping or rotational moment based on image recognition of the waste receptacle 110 (e.g., determining a type, size, or approximated weight of the waste receptacle 110 using the image recognition of the waste receptacle 110 and a database). The controller 1202 can also use machine learning, artificial intelligence, or a neural network that is trained to predict tipping or physical response of the waste receptacle 110 based on the requested or commanded operation of the lift apparatus 1212.

Referring particularly to FIG. 13, a flow diagram of a process 1300 for warning an operator of a refuse vehicle that a waste receptacle may be tipped over includes steps 1032-1326, according to some embodiments. The process 1300 can be performed by the detection and alert system 1200 (e.g., a control system) to detect proper alignment between a collection or loading apparatus and a receptacle, and to predict if operation of the collection or loading apparatus will knock over (e.g., tip, completely tip over, etc.) the receptacle.

The process 1300 includes obtaining a user input including a request to perform an operation with a lift apparatus of a ref use vehicle (step 1302), according to some embodiments. In some embodiments, the lift apparatus is configured to releasably secure with a receptacle, lift the receptacle, and empty contents of the receptacle into a hopper of the refuse vehicle. In some embodiments, the refuse vehicle is a front loader, a side loader, or a rear loader. In some embodiments, the lift apparatus is a grabber (e.g., a side loading arm), a front arm, a rear or tailgate arm, etc., that is configured to load the receptacle and empty the receptacle into the hopper or inner volume of the refuse vehicle. The lift apparatus may operate by moving, translating, or rotating through space (e.g., relative to the refuse vehicle, relative to a lateral side of the refuse vehicle such as a curb side or street side of the refuse vehicle, etc.). In some embodiments, the lift apparatus is configured to extend or retract to reposition a grasping portion (e.g., a grabber) of the lift apparatus. In some embodiments, the user input is received from a joystick or from a user input device within a cab of the refuse vehicle (e.g., waste-collection vehicle 102). In some embodiments, step 1302 includes performing steps 1104-1110 of process 1100. Step 1302 can be performed by the controller 1202 and the input device 1210 of the system 1200.

The process 1300 includes operating the lift apparatus to perform the requested operation in response to the user input (step 1304), according to some embodiments. In some embodiments, step 1304 includes generating control signals for controllable elements (e.g., pneumatic cylinders, hydraulic cylinders, linear electric actuators, hydraulic motors, pumps, etc.) of the lift apparatus. In some embodiments, step 1304 includes operating the lift apparatus to perform the requested operation (e.g., to perform a lift operation) until an override condition (e.g., a stoppage condition, a stoppage event, etc.) is detected by the controller 1202.

The process 1300 includes obtaining image data of the lift apparatus and a refuse receptacle for loading by the lift apparatus (step 1306), according to some embodiments. In some embodiments, the step 1306 is performed by the controller 1202 and the camera 104. For example, the camera 104 may be positioned on a same lateral side of the refuse vehicle as the lift apparatus and can obtain the image data of the lift apparatus and the refuse receptacle. In some embodiment, step 1102 is performed simultaneously or at least partially concurrently with steps 1302-1304.

The process 1300 includes determining, based on the image data, if the lift apparatus is properly aligned with the refuse receptacle (step 1308), according to some embodiments. In some embodiments, step 1308 is performed by the controller 1202 based on the image data obtained in step 1306. In some embodiments, step 1308 includes identifying one or more boundaries of a zone that indicate proper alignment for the lift apparatus, and determining, based on the image data, if the refuse receptacle is positioned within the boundaries of the zone. In some embodiments, step 1308 includes performing an image analysis technique such as described in greater detail above with reference to the FIGS. 1-8.

The process 1300 includes predicting, based on (i) the alignment of the lift apparatus and the receptacle and (ii) the user input, if the lift apparatus is likely to knock over the refuse receptacle (step 1310), according to some embodiments. In some embodiments, step 1310 is performed based on the user input obtained in step 1302 and the results of step 1308. In some embodiments, step 1310 includes predicting a moment that may be applied to the refuse receptacle if the user input is performed with current alignment between the lift apparatus and the refuse receptacle. In some embodiments, step 1310 includes using predicted motion of the lift apparatus (e.g., within the zone or within the boundaries of the zone) relative to the position of the refuse receptacle.

In response to the lift apparatus being properly aligned with the refuse receptacle (step 1312, "YES"), process 1300 proceeds to step 1314. In response to the lift apparatus being improperly aligned with the refuse receptacle (step 1312, "NO"), process 1300 proceeds to step 1316. Process 1300 includes notifying the operator of proper alignment (step 1314), and notifying the operator of improper alignment (step 1316), according to some embodiments. In some embodiments, steps 1314 and 1316 are performed by the controller 1202 and the alert device(s) 1214 (e.g., a display screen positioned within a cab of the refuse vehicle, an alert light, a speaker, etc.). In some embodiments, steps 1314 and 1316 include providing a specific color of light (e.g., a visual alert) to the operator to notify the operator of the refuse vehicle whether the lift apparatus and the refuse receptacle are properly aligned (e.g., displaying a red color responsive to improper alignment, or a green color responsive to improper alignment). In some embodiments, steps 1314 and 1316 include providing textual information on a display screen such as a personal computer device, a smartphone, a portable display screen, a display screen mounted on a side of the refuse vehicle, a display screen within a cab of the refuse vehicle, etc. In some embodiments, steps 1314 and 1316 include providing aural feedback such as by operating a speaker, providing a beeping tone, activating an alarm, using a speech engine to provide spoken feedback to the operator, etc. In some embodiments, steps 1314 and 1316 include providing haptic feedback to the operator of the refuse vehicle.

In response to the lift apparatus being predicted to knock or tip over the receptacle (step 1318, "YES"), the process 1300 proceeds to step 1324. In response to the lift apparatus not being predicted to tip over the refuse receptacle (step 1318, "NO"), the process 1300 proceeds to step 1320. The process 1300 includes alerting the operator of a predicted or imminent tipping event (step 1324) and limiting operation of the lift apparatus (step 1326) in response to determining that the lift apparatus is predicted to knock or tip over the receptacle (step 1318), according to some embodiments. In some embodiments, step 1324 include increasing an alert level relative to step 1316 (e.g., providing additional textual, aural, vocal, visual, etc., alerts). In some embodiments, step 1324 and 1326 are performed concurrently or at least partially simultaneously with the step 1302. For example, if the operator provides a user input to perform an operation that the controller 1202 determines will tip over the refuse receptacle, the controller 1202 may alert the operator that the operation cannot be performed due to predicted tipping of the refuse receptacle and limit operation of the lift apparatus. In another example, even if the operation is predicted to tip over the refuse receptacle, the controller 1202 may allow and control operation of the lift apparatus to perform the requested operation and limit operation once the predicted tipping event is imminent (e.g., the lift apparatus is about to tip over the receptacle). In some embodiments, step 1326 is optional, and the operator can control operation of the lift apparatus, but alerts and/or alarms are provided to the operator that the operation will likely cause a tipping event at the refuse receptacle to prompt the operator to adjust relative positioning between the lift apparatus and the refuse receptacle before performing the operation. In some embodiments, the operator can provide an additional user input to the controller 1202 to override the alerts of the predicted tipping event (and limited operation of the lift apparatus) so that the lift apparatus performs the operation.

The process 1300 also includes alerting the operator of proper alignment (step 1320) and operating the lift apparatus (step 1322) responsive to the lift apparatus not being predicted to knock over the receptacle (step 1318, "NO"), according to some embodiments. In some embodiments, steps 1320 and 1322 are performed by the controller 1202 and the alert device(s) 1214.

Object Detection System

Figure 16:
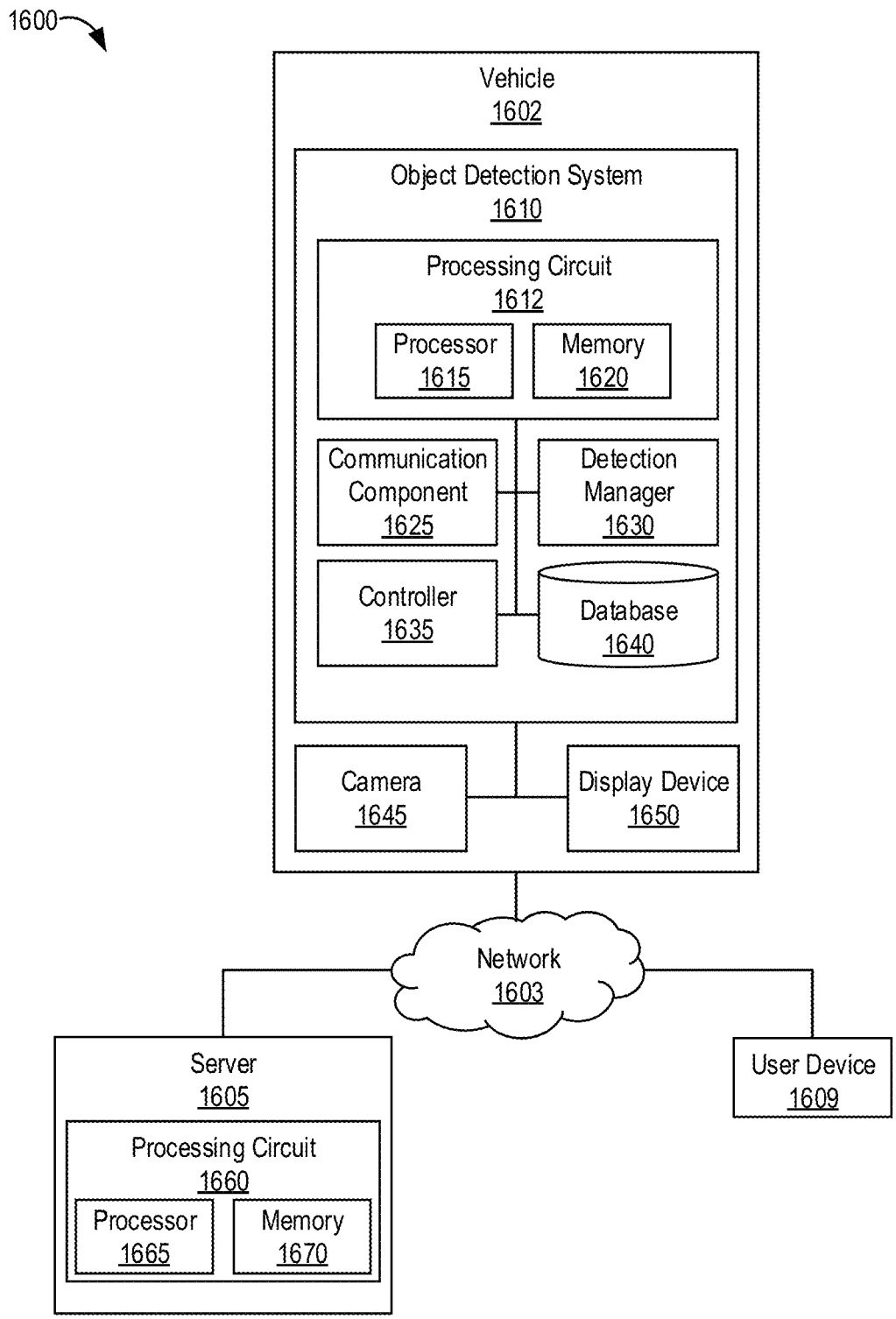
FIG. 16 is a block diagram of system for use in object detection, according to some embodiments.

FIG. 16 depicts a system 1600 for use in detecting objects proximate to curb-side collection locations, according to some embodiments. Each system and/or component of the system 1600 can include one or more processors, memory, network interfaces, communication interfaces, and/or user interfaces. Memory can store programming logic that, when executed by the processors, controls the operation of the corresponding computing system or device. Memory can also store data in databases. The network interfaces can allow the systems and/or components of the system 1600 to communicate wirelessly. The communication interfaces can include wired and/or wireless communication interfaces and the systems and/or components of the system 1600 can be connected via the communication interfaces. The various components in the system 1600 can be implemented via hardware (e.g., circuitry), software (e.g., executable code), or any combination thereof. Systems, devices, and components in FIG. 16 can be added, deleted, integrated, separated, and/or rearranged.

The system 1600 can include at least one vehicle 1602, at least one network 1603, at least one server 1605, and at least one user device 1609. The vehicle 1602 can be a refuse vehicle. The vehicle 1602 can be and/or include at least one of the refuse vehicles described herein. For example, the vehicle 1602 can include the waste-collection vehicle 102. The vehicle 1602 can also include components and/or elements similar to that of the vehicles described herein.

The vehicle 1602 can include at least object detection system 1610, at least one camera 1645, and at least one display device 1650. The components of the vehicle 1602 and/or the components of the system 1600 can be electrically coupled with one another. For example, the object detection system 1610 can be electrically coupled with the cameras 1645. The components of the vehicle 1602 and/or the components of the system 1600 can also communicate with, interact with, and/or otherwise interface with one another. For example, the components can communicate via a controller area network (CAN).

The cameras 1645 can be and/or include the cameras described herein. For example, the cameras 1645 can include the cameras 104. The cameras 1645 can also be at least one of a video camera that captures video, a camera that captures images and/or among other possible optical instruments and/or optical devices that can capture, record, produce and/or otherwise provide videos and/or images. The cameras 1645 can also include audio devices. For example, the cameras 1645 can include at least one of a speaker, a microphone, a headphone, and/or among other possible audio and/or sound devices. The cameras 1645 can provide video data to the object detection system 1610. The video data can be and/or include video feeds, images, recordings, audio files, audio signals, and/or any other possible information that can be captured, produced and/or otherwise provided by the cameras 1645.

The cameras 1645 can also include sensors. The sensors can be and/or include an accelerometer, a tachometer, a speedometer, a GPS device/sensor, a temperature sensor, a voltmeter, an ammeter, a radar sensor, a pressure sensor, a tactile sensor, a photodetector, a motion sensor, a proximity sensor, a position sensor, and/or among other possible sensors and/or devices. For example, the cameras 1645 can include a position sensor and the position sensor can provide data that indicates a position of the vehicle 1602 relative to an object (e.g., a curb, a waste receptacle, etc.). The cameras 1645 can also collect and/or otherwise provide information similar to that of any sensor and/or camera described herein.

The cameras 1645 can include machine vision and the cameras 1645 can be trained to recognize refuse containers. For example, the cameras 1645 can be trained to recognize the waste receptacle 110. The cameras 1645 can also be trained to recognize any other type of container described herein. The cameras 1645 can also be trained to recognize additional objects. For example, the cameras 1645 can be trained to recognize utility boxes, mailboxes, and/or among other possible objects. The cameras 1645 can also collect, record, and/or otherwise capture data that can be used to recognize objects and the data can be provided to the object detection system 1610. For example, the camera 1645 can provide image data to the object detection system 1610. To continue this example, the object detection system 1610 can determine and/or otherwise recognize objects based on the image data provided by the camera 1645. As another example, the object detection system 1610 can be trained similar to that of the cameras 1645 and the object detection system 1610 can recognize the waste receptacle 110.

The cameras 1645 can provide, to the object detection system 1610, operational data, status information, and telemetry data associated with the vehicle 1602. The data associated with the vehicle 1602 can be and/or include at least one of a speed of the vehicle 1602, an acceleration of the vehicle 1602, a location of the vehicle 1602, an operator input (e.g., an input provided by an operator of the vehicle 1602), movement and/or actions performed and/or pertaining to controllable/movable elements of the vehicle 1602, and/or an environmental condition of the vehicle 1602. For example, the data can include information pertaining to a position of an arm of the vehicle 1602 (e.g., the arm is extended away from the body of the vehicle 1602, the arm is retracted towards the body of the vehicle 1602, etc.).

The display devices 1650 can be and/or include a screen, a monitor, a visual display device, a television, a video display, a liquid crystal display (LCD), a light emitting diode (LED) display, an infotainment system, a mobile device, and/or among other possible displays and/or devices. For example, the display device 1650 can be an infotainment system disposed within a cab of the vehicle 1602. The display device 1650 can be and/or include the display devices described herein. The display device 1650 can also perform similar functionality to that of the display devices described herein. The display device 1650 can generate, produce, provide and/or otherwise display a user interface. For example, the display device 1650 can display a user interface that includes an indicator that a container has been detected. The display device 1650 can also receive, via a user interface, operator input. The operator input can be and/or include at least one of the operator selecting an icon pertaining to a certain vehicle operation (e.g., move arm, lift arm, activate a grasping mechanism, etc.), the operator selecting an icon to provide input pertaining to a detection of an object (e.g., the operator can confirm that the object detected was indeed the waste receptacle 110), and/or the operator selecting an icon to indicate improper placement of the waste receptacle 110 on the curb (e.g., the waste receptacle was too close to another object, the waste receptacle was facing and/or orientated the wrong way, etc.).

The network 1603 can be and/or include a local area network (LAN), a wide area network (WAN), a telephone network (such as the Public Switched Telephone Network (PSTN)), Controller Area Network (CAN), wireless link, intranet, the Internet, a cellular network and/or combinations thereof. The user device 1609 can be and/or include at least one of a mobile computing device, a desktop computer, a smartphone, a tablet, a smart watch, a smart sensor and/or any other device that can facilitate providing, receiving, displaying and/or otherwise interacting with content (e.g., webpages, mobile applications, etc.).

An operator of the user device 1609 can perform various actions and/or access various types of information. The information can be provided over the network 1603 (e.g., the Internet, LAN, WAN, cellular, etc.). Similarly, the user device 1609 can be perform similar functionality to that of the display device 1650. The user device 1609 can include an application to receive information, display information, and receive user interactions with the content. For example, the application can be a web browser and/or a mobile application.

The server 1605 can be and/or include at least one of a remote device, an external database, a computing device, and/or among other possible computer hardware and/or computer software that can interface with, via the network 1603, the vehicle 1602 and/or the user device 1609. For example, the object detection system 1610 can provide an indication to the server 1605 that a container located proximate to a given curb-side location could have a different placement and the server 705 can send a message to the user device 1609 associated with the owner and/or entity associated with the container.

The server 1605 can include at least one processing circuit 1660. The processing circuit 1660 can include at least one processor 1665 and memory 1670. The processing circuit 1660 and/or the component thereof (e.g., the processors 1665 and memory 1670) can perform similar functionality to that of object detection system 1610 and/or a component thereof. The server 1605 can also include, store, maintain and/or otherwise host the object detection system 1610. For example, the object detection system 1610 can be remote and/or external to the vehicle 1602 and the vehicle 1602 can communicate with the object detection system 1610. By way of another example, the object detection system 1610 can be distributed across one or more servers (e.g., the server 705) and one or more vehicles (e.g., the vehicle 1602).

The object detection system 1610 can include at least one processing circuit 1612, at least one communication component 1625, at least one detection manager 1630, at least one controller 1635, and at least one database 1640. The processing circuit 1612 can include at least one processor 1615 and memory 1620. Memory 1620 can be one or more devices (e.g., RAM, ROM, Flash memory, hard disk storage) for storing data. Memory 1620 can also store computer code and/or instructions for executing, completing and/or facilitating the various processes described herein. For example, memory 1620 may store instructions and the instructions may cause the processors 1615 to perform functionality similar to that of the object detection system 1610 and/or a component thereof. Memory 1620 can be or include non-transient volatile memory, non-volatile memory, and non-transitory computer storage media. Memory 1620 can include database components, object code components, script components, or any other type of information structure for supporting the various activities and information structures described herein. Memory 1620 can be communicably coupled with the processors 1615. Memory 1620 can also be electrically coupled with the processors 1615. The processors 1615 can be implemented as one or more application specific integrated circuits (ASICs), one or more field programmable gate arrays (FPGAs), a group of processing components, and/or other suitable electronic processing components.

The communication component 1625 can be and/or include network communication devices, network interfaces, and/or other possible communication interfaces. The communication component 1625 can be and/or include wired or wireless communications interfaces (e.g., jacks, antennas, transmitters, receivers, transceivers, wire terminals, etc.) for conducting data communications with sensors, devices, systems, etc., of the vehicle 1602 and/or other external systems or devices (e.g., the server 1605 and the user device 1609). The communication component 1625 can be direct (e.g., local wired or wireless communications) and/or via a communications network (e.g., the network 1603). For example, the communication component 1625 can include an Ethernet card and port for sending and receiving data via an Ethernet-based communications link or network. The communication component 1625 can also include a Wi-Fi transceiver for communicating via a wireless communications network (e.g., the network 1603). The communication component 1625 can include a power line communications interface. The communication component 1625 can include an Ethernet interface, a USB interface, a serial communications interface, and/or a parallel communications interface. The communication component 1625 can interface with, interact with and/or otherwise communicate with at least one of the cameras 1645, the display device 1650, the server 1605, the user device 1609, and/or any other possible components of the vehicle 1602.

The communication component 1625 can receive, from the cameras 1645, data pertaining to the vehicle 1602 and/or the area around and/or proximate to the vehicle 1602. For example, the communication component 1625 can receive data including objects captured by the cameras 1645. The objects can be located proximate to the vehicle 1602. For example, the objects can be located on a curb of a street. The objects can be waste receptacles, mailboxes, utility boxes, and/or among other possible objects that may be located proximate to a curb-side location. The communication component 1625 can provide, to the detection manager 1630, the data collected by the cameras 1645.

The detection manager 1630 can receive, from the communication component 1625, the data collected by the cameras 1645. The detection manager 1630 can review, analyze, inspect, and/or otherwise examine objects collected by the cameras 1645. For example, the cameras 1645 can take a picture and/or otherwise capture an image of the objects and the captured imaged can be provided to the detection manager 1630. The detection manager 1630 can examine a number of pixels between objects included in the image captured by the cameras 1645. For example, the detection manager 1630 can examine the number of pixels by at least one of measuring the pixels around a boundary box of the objects captured in the image, measuring the number of pixels between boundary boxes, and/or among other possible evaluation techniques. As another example, the detection manager 1630 can measure the number of pixels from a center of a boundary box for a first object to a center of a boundary box for a second object.

The detection manager 1630 can identify at least one object type associated with the objects captured by the cameras 1645. The object types can be and/or include at least one of waste containers, mailboxes, utility boxes, and/or among other possible object types. For example, the detection manager 1630 can identify that the object captured by the camera 1645 is the waste receptacle 110. The detection manager 1630 can also determine a distance between the vehicle 1602 and the object captured by the cameras 1645. For example, the camera 1645 can include and/or communicate with a proximity sensor and the data collected by the proximity sensor can also be provided to the detection manager 1630. The detection manager 1630 can use the data collected by the proximity sensor to determine a distance between the vehicle 1602 and the object.

The detection manager 1630 can generate, using the data collected by the cameras 1645, a distance plot. For example, the detection manager 1630 can use proximity data collected by the cameras 1645 to determine when objects were detected. The detection manager 1630 can use time stamps associated with when the objects were detected and the speed of the vehicle 1602 at the time the objects were detected to determine a position, a placement, and/or a size of the objects. For example, the detection manager 1630 can determine that a first waste receptacle is positioned two feet from a second waste receptacle. The detection manager 1630 can associate given objects with given points on the distance plot. For example, the detection manager 1630 can use image data collected by the cameras 1645 and the proximity information to determine which objects are located are certain points on the path of the vehicle 1602.

The detection manager 1630 can determine the position and the distance of the objects captured by the cameras 1645 relative to the position of the vehicle 1602. For example, the detection manager 1630 can determine that a first waste receptacle is positioned 3 feet from a side of the vehicle 1602. The detection manager 1630 can also determine the distance of the objects from one or more components of the vehicle 1602. For example, the detection manager 1630 can determine the distance of the waste receptacles from an arm and/or grabbing mechanism of the vehicle 1602.

The detection manager 1630 can use the determined position and/or the determined distance of the objects to control, update, maintain, and/or otherwise adjust operation of one or more controllable elements of the vehicle 1602. For example, the detection manager 1630 can determine that an arm extending away from the body of the vehicle 1602 is approaching a mailbox (e.g., the arm may hit the mailbox) and the detection manager 1630 can interrupt the operation (e.g., stop the arm from extending away from the vehicle 1602) by transmitting a signal to the controller 1635. The controller 1635 can, responsive to receiving the signal form the detection manager 1630, interrupt the operation. For example, the controller 1635 can transmit signals to one or more controllable elements associated with moving the arm of the vehicle 1602 and the signals transmitted by the controller 1635 can stop the controllable elements. The signals transmitted by the controller 1635 can also alter operation of the controllable elements. For example, the signal can cause the controllable elements to slide, lift, rotate, pivot, and/or otherwise move the arm away from the mailbox.

Figure 17:
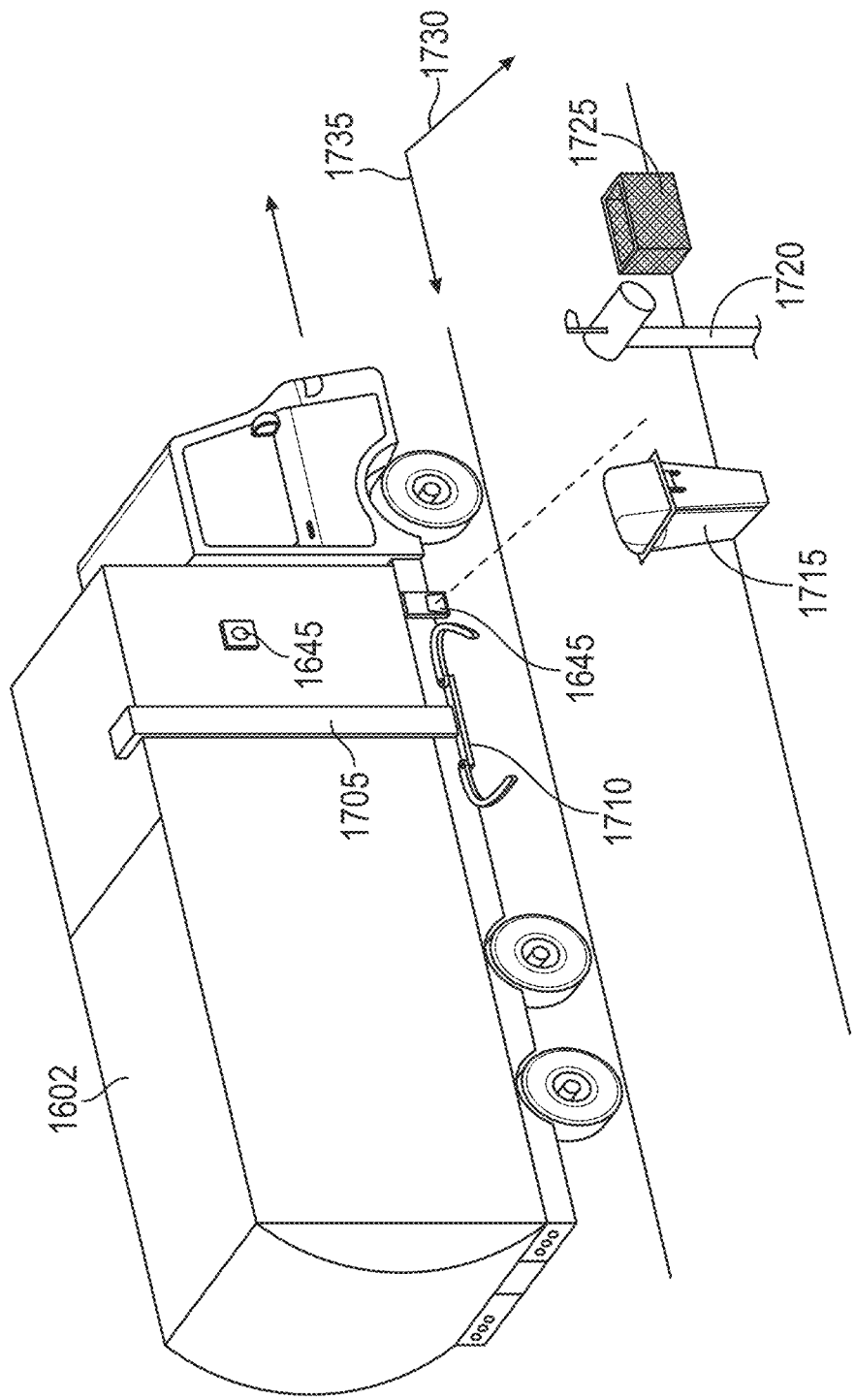
FIG. 17 is a perspective view of a vehicle included in the system illustrated in FIG. 16, according to some embodiments.

FIG. 17 depicts a perspective view of the vehicle 1602, according to some embodiments. FIG. 17 depicts an example of the vehicle 1602 located proximate to a curb-side location. The curb-side location can include objects 1715, 1720, and 1725. FIG. 17 shows an example of the object 1715 as a waste receptacle (e.g., the waste receptacle 110), an example of the object 1720 as a mailbox, and an example of the object 1725 as a utility max. The vehicle 1602 can include elements 1705 and 1710. The element 1705 is shown to be an arm of the vehicle 1602 and the element 1710 is shown to a grasping mechanism of the vehicle 1602. The vehicle 1602 can also include a first camera 1645 and a second camera 1645. The first camera 1645 is shown to be disposed proximate to an under carriage of the vehicle 1602 and the second camera 1645 is shown to be disposed on a side member of the vehicle 1602. The first camera 1645 is shown to include a sensor. The sensor can be at least one of the sensors described herein.

In some embodiments, the second camera 1645 can obtain data (e.g., images, information, object detection, etc.) that corresponds to an area behind one or more objects. For example, the second camera 1645 can be unobstructed by objects (e.g., waste receptacles, mailboxes, utility boxes, etc.) and as such can capture an area behind the objects. To continue this example, the second camera 1645 can capture an area obstructed from view of the first camera 1645. In this example, the object 1715 can obstruct the first camera 1645 from capturing an area behind the object 1715 (e.g., the area is block by the object 1715). Given the obstruction by the object 1715, on the first camera 1645, the first camera 1645 may be unable to collect data that corresponds to the area behind the object 1715. In this example, the placement of the second camera 1645 (e.g., an elevated position on the vehicle 1602) may provide the second camera 1645 with a view of the area behind the object 1715. To continue this example, the second camera 1645 may be able to collect data that corresponds to the area behind the object 1715.

The first camera 1645 and/or the second camera 1645 can obtain data corresponding to the objects 1715, 1720, and 1725. The camera 1645 can provide data (e.g., obtained data) to the object detection system 1610. The object detection system 1610 can detect, using the data provided by the cameras 1645, the objects 1715, 1720, and 1725. The object detection system 1610 can, responsive to detecting the objects, determine, identify, and/or otherwise recognize the objects. For example, the object detection system 1610 can recognize the object 1715 as a waste receptacle, recognize the object 1720 as a mailbox, and recognize the object 1725 as a utility box.

The object detection system 1610 can determine, using the data obtained by the cameras 1645, a position and a distance of the objects 1715, 1720, and 1725. As shown in FIG. 17, the position of the objects can be relative to an axis 1735 and the distance of the objects can be relative to an axis 1730. The axis 1730 can represent one or more distance points relative to the vehicle 1602. The axis 1735 can represent one or more position points relative to the vehicle 1602. The position of the objects can be at least one of a position of the objects relative to one another and/or a placement of the objects relative to curb-side location. For example, a position of a first object can be represented as a difference between a first point of the axis 1735 and a second point of the axis 1735. The distance of the objects can be a distance relative to the vehicle 1602.

Figure 18:
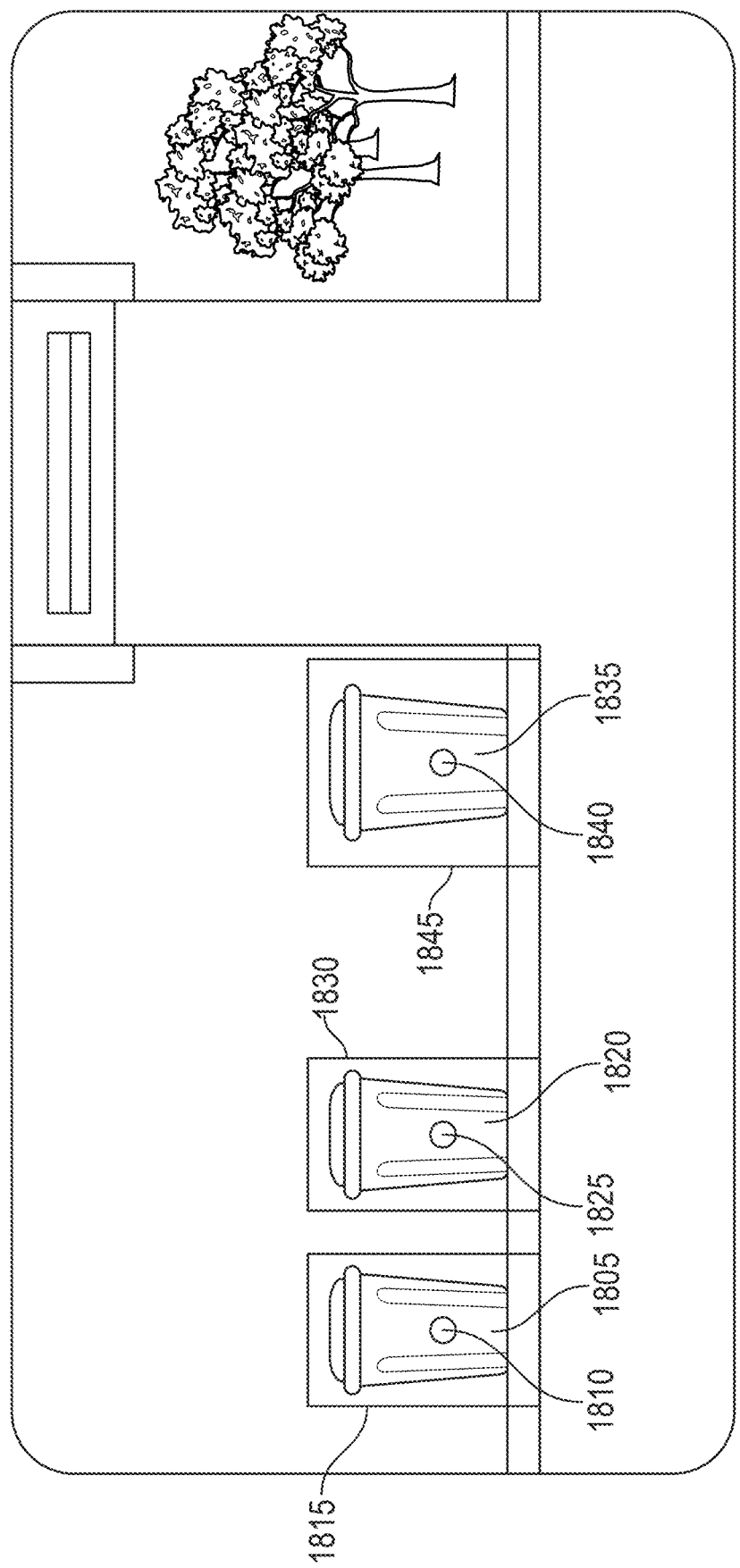
FIG. 18 is a perspective view of a curb-side location, according to some embodiments.

FIG. 18 depicts a perspective view of a curb-side location, according to some embodiments. The curb-side location can be and/or include the curb-side location shown in FIG. 17. The perspective view can include objects 1805, 1820, and 1835. The objects shown in FIG. 18 can be and/or include the objects shown in FIG. 17. FIG. 18 shows the objects 1805, 1820, and 1835 as waste receptacles. The object 1805 can have a center point 1810 and a bounding box 1815. The bounding box 1815 can be generated by the detection manager 1630. The cameras 1645 can obtain and/or otherwise capture data associated with the curb-side location and the data can be used by the detection manager 1630 to recognize the objects 1805, 1820, and 1835.

The detection manager 1630 can use at least one of the bounding box 1815 and/or the center point 1810 to recognize and/or identify the object 1805. The detection manager 1630 can measure the pixels around the object 1805 and the detection manager 1630 can compare the number of pixels with information located in the database 1640. For example, the database 1640 can include information that indicates a number of pixels for one or more object types (e.g., a waste receptacle can have 10 pixels, a mailbox can have 5 pixels, and/or among other possible examples). The detection manager 1630 can compare the number of measured pixels with the information located in the database 1640 to recognize the object type. For example, the detection manager 1630 can recognize the object 1805 as a waste receptacle.

FIG. 18 also shows the object 1820 including a center point 1825 and a bounding box 1830, and shows the object 1835 including a center point 1840 and a bounding box 1845. The detection manager 1630 can use the center points 1810, 1825, and 1840 to determine a distance between the objects 1805, 1820, and 1835. For example, the detection manager 1630 can measure a number of pixels between the center points 1810 and 1825 to determine a distance between the object 1805 and the object 1820.

Figure 19:
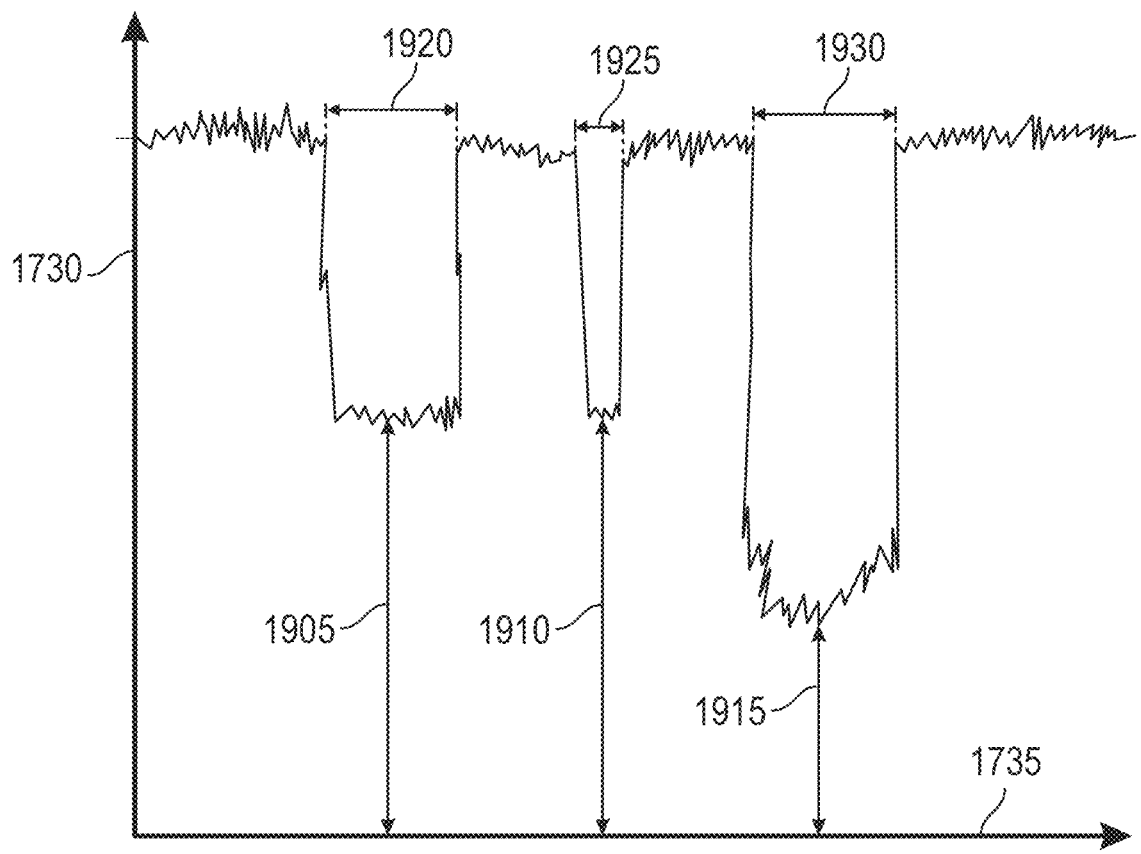
FIG. 19 is a graph illustrating distances between objects and the vehicle included in the system illustrated in FIG. 16, according to some embodiments.

FIG. 19 depicts a distance plot 1900, according to some embodiments. The distance plot 1900 can be generated by the object detection system 1610 and/or a component thereof. The object detection system 1610 can generate the distance plot 1900 using data obtained by the cameras 1645. The distance plot 1900 is shown to have distance corresponding to the Y-axis (e.g., the axis 1730) and position corresponding to the X-axis (e.g., the axis 1735). Reference numbers 1905, 1910, and 1915 can correspond to a distance between objects and the vehicle 1602 based on the axis 1730. Reference number 1905 can correspond to a distance between the object 1725 and the vehicle 1602, reference number 1925 can correspond to a distance between the object 1720 and the vehicle 1602, and reference number 1915 can correspond to a distance between the object 1715 and the vehicle 1602.

The detection manager 1630 can determine the distance between the objects and the vehicle 1602 using data obtained by the cameras 1645. For example, the cameras 1645 can have a max range (e.g., a maximum distance that the cameras 1645 can capture data) and the detection manager 1630 can use a difference between the max range and a pre-determined setpoint to determine the distance between the objects and the vehicle 1602.

Reference numbers 1920, 1925, and 1930 can correspond to a position of objects. Reference number 1920 can correspond to a position of the object 1725, reference number 1925 can correspond to a position of the object 1720, and reference number 1930 can correspond to the object 1715. The detection manager 1630 can use data obtained by the cameras 1645 to determine the position of the objects. For example, the detection manager 1630 can use a speed of the vehicle 1602 along with data segments of the distance plot to determine the position of the objects.

Figure 20:
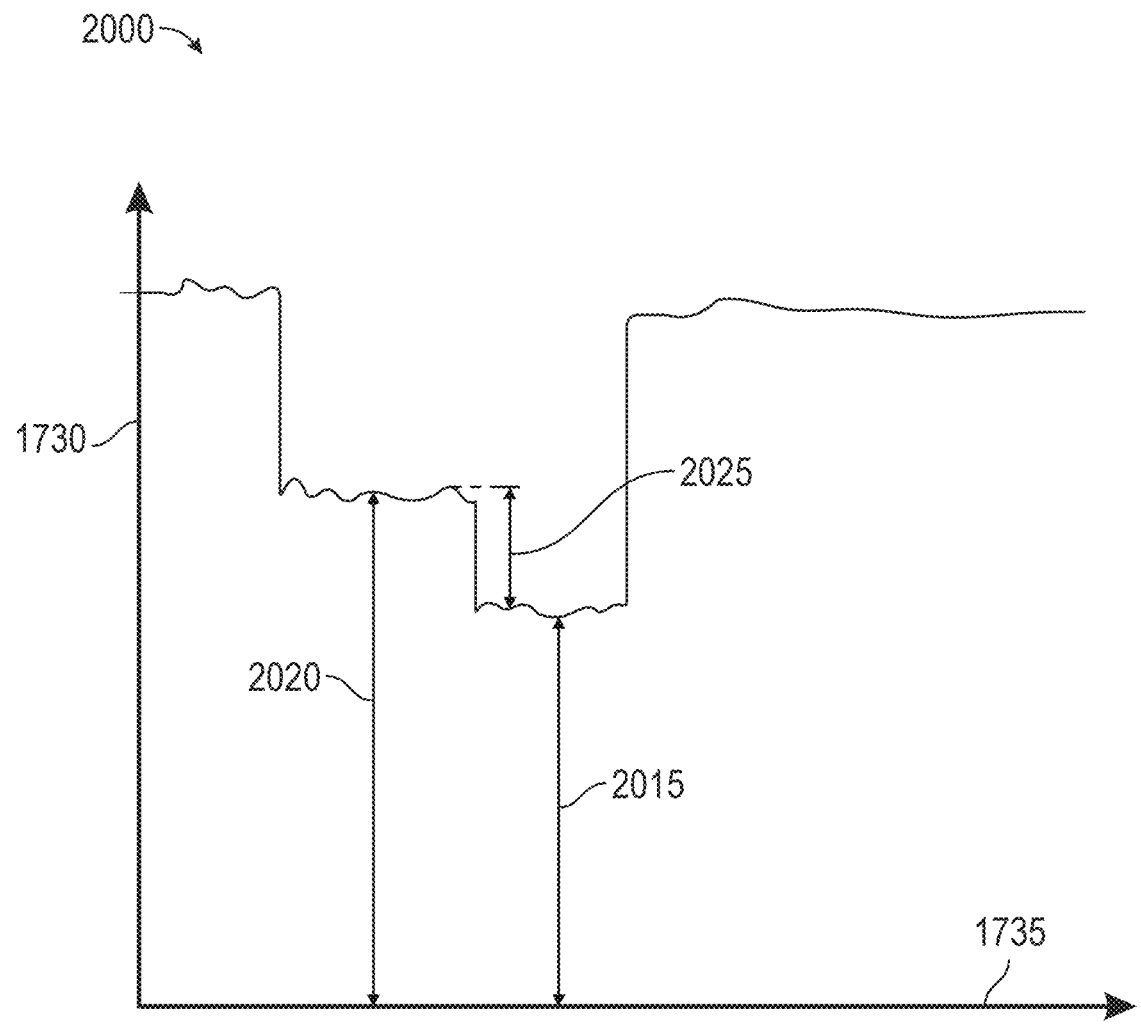
FIG. 20 is a graph illustrating distances between objects and the vehicle included in the system illustrated in FIG. 16, according to some embodiments.

FIG. 20 depicts a graph 2000, according to some embodiments. In some embodiments, the graph 2000 may correspond to information and/or data collected by the cameras 1645. For example, the graph 2000 may include information collected by a first camera 1645 and a second camera 1645. In some embodiments, the first camera 1645 and the second camera 1645 may correspond to the cameras 1645 illustrated in FIG. 17. For example, the second camera 1645 may be elevated and/or superior to the first camera 1645. In some embodiments, reference numbers 2015, 2020, and 2025 may represent one or more distances. For example, the reference number 2015 may represent a distance between an object (e.g., a waste receptable, a car, a mailbox, etc.) and the vehicle 1602. As another example, the reference number 2020 may represent a distance between a second object and the vehicle 1602. As even another example, the reference number 2025 may represent a distance between objects (e.g., a distance between a waste receptacle and a car). In some embodiments, the object detection system 1610 may prevent and/or stop one or more vehicle operations based on the distance between objects. For example, the object detection system 1610 may prevent a grabbing mechanism from engaging with a waste receptacle. To continue this example, a distance between objects may be such that the grabbing mechanism may contact and/or encroach an object proximate to a waste receptacle (e.g., the object and the waste receptable are too close to one another).

Figure 21:
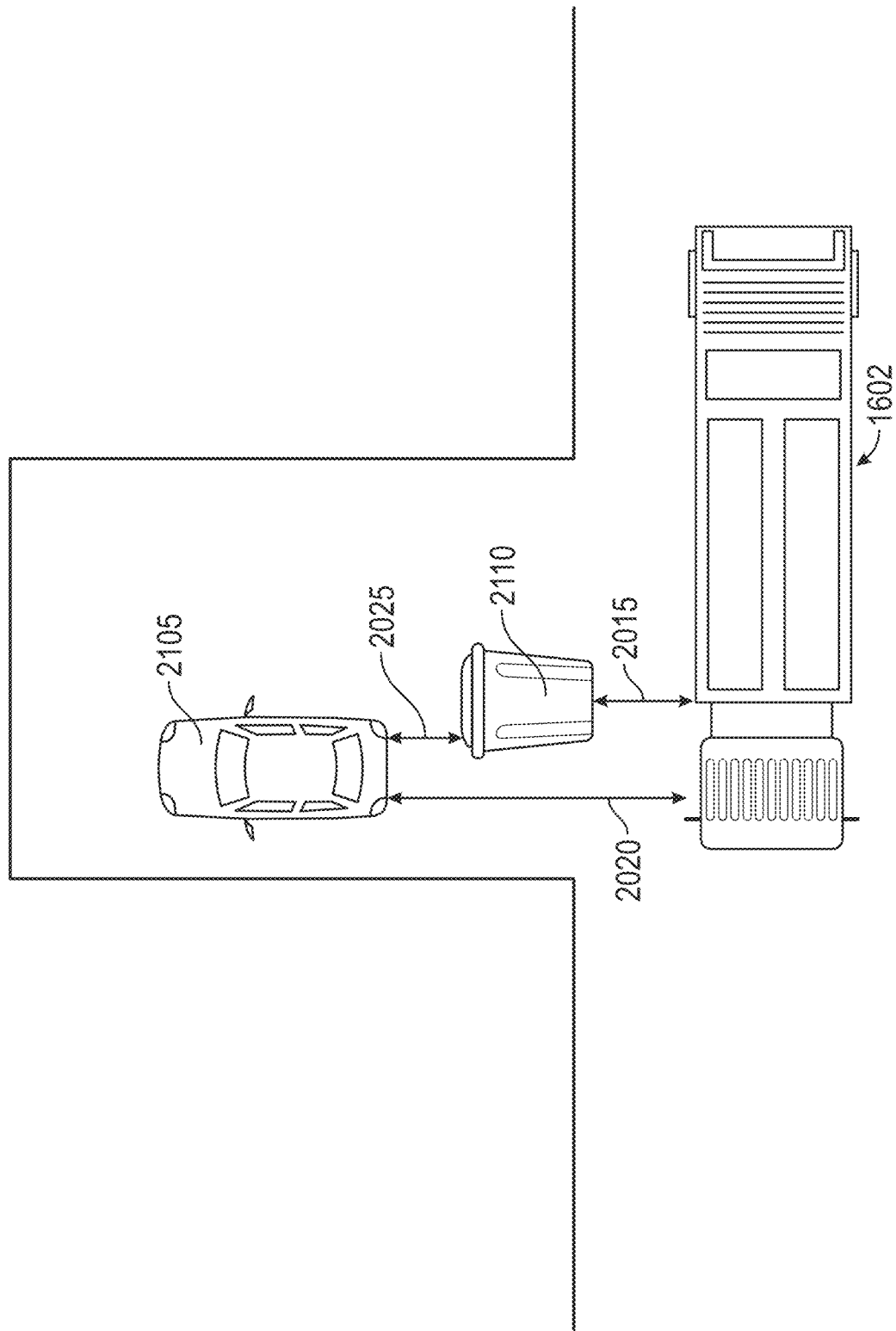
FIG. 21 is a perspective view of a curb-side location, according to some embodiments.

FIG. 21 is a perspective view of a curb-side location, according to some embodiments. In some embodiments, the graph 2000 may correspond to the perspective view shown in FIG. 21. For example, the reference number 2015 is shown to correspond to a distance between an object 2110 (e.g., a waste receptacle) and the vehicle 1602. As another example, the reference number 2020 is shown to correspond to a distance between an object 2105 (e.g., a vehicle, car, etc.) and the vehicle 1602. As another example, the reference number 2025 is shown to correspond to a distance between the object 2105 and the object 2110. In some embodiments, the object detection system 1610 may determine, based on the distance between the object 2105 and the object 2110, that the objects are too close (e.g., not enough clearance room, etc.). In other embodiments, the object detection system 1610 may determine, based on the distance between the object 2105 and the object 2110, that there is enough space and/or room between the objects.

In some embodiments, the object 2110 may obstruct and/or block at least a portion of the object 2105 from view. For example, the object 2110 may obstruct the object 2105 from view of a camera 1645 disposed proximate to an under carriage of the vehicle 1062. To continue this example, a camera disposed on a side of the vehicle 1602 may be elevated and/or superior to the camera 1645 such that the camera is able to capture an area obstructed by the object 2110.

In some embodiments, the object 2105 may be wider and/or larger than the object 2110. For example, a portion of the object 2105 may extend beyond the object 2110. To continue this example, the camera 1645 may detect the portion of the object 2105 given the object 2110 would not completely obstruct the object 2105. In this example, the object detection system 1610 may determine the distance between objects based on the portion of the object 2105 not obstructed by the object 2110.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A refuse vehicle, comprising:
 a first camera disposed proximate to an under carriage of the refuse vehicle, the first camera configured to capture a first area extending from the refuse vehicle;
 a second camera disposed on a side member of the refuse vehicle, the second camera located superior to the first camera, and the second camera configured to capture a second area extending from the refuse vehicle; and
 one or more processing circuits in communication with the first camera and the second camera, and the one or more processing circuits configured to:
  receive, from the first camera and the second camera, first data associated with a collection site proximate to the refuse vehicle, the collection site including a first object and a second object;
  detect, responsive to receipt of the first data, the first object and the second object based on the first data;
  generate, for the first object, one or more bounding boxes to establish a dimension for the first object; and
  determine, using the one or more bounding boxes, a position of the first object relative to the second object;
 the first camera obstructed, by the first object or the second object, from capturing at least a portion of an area that includes the collection site; and
 the second camera unobstructed from capturing the at least a portion of the area that includes the collection site.

2. The refuse vehicle of claim 1, wherein the one or more processing circuits are configured to:
 determine, based on one or more time stamps included in the first data and a speed of the refuse vehicle at the one or more time stamps, a size of the first object;
 determine, based on one or more second time stamps included in the first data and a speed of the refuse vehicle at the one or more second time stamps, the position of the first object relative to the second object; and
 adjust, responsive to determination of the size of the first object and the position of the first object relative to the second position, one or more operations of the refuse vehicle.

3. The refuse vehicle of claim 1, wherein the one or more processing circuits are configured to:
 generate a plot including one or more data points corresponding to one or more points in time for when the first camera or the second camera captured data;
 associate, using an image captured by the first camera or the second camera, the first object with one or more segments of the plot; and
 determine, using the one or more segments of the plot and an operating parameter of the refuse vehicle, the position of the first object relative to the refuse vehicle.

4. The refuse vehicle of claim 3, comprising a display device located within a cab of the refuse vehicle, and wherein the one or more processing circuits are configured to:
 display, via the display device, a user interface including the position of the first object relative to the second object;
 receive, via the user interface, an input indicating an adjustment to the position of the first object relative to the second object; and
 provide, to a user device, a message specifying the adjustment to the position of the first object relative to the second object.

5. The refuse vehicle of claim 1, wherein the first object is a waste receptable, wherein the second object is a vehicle, and wherein the one or more processing circuits are configured to:
 determine, using a distance between the first object and the second object, that a first operation of the refuse vehicle would result in an element of the refuse vehicle moving proximate to the second object; and
 prevent, responsive to determining that the first operation of the refuse vehicle would result in the element of the refuse vehicle moving proximate to the second object, the first operation of the refuse vehicle.

6. The refuse vehicle of claim 5, wherein the element is a grabbing mechanism configured to engage with the waste receptacle.

7. The refuse vehicle of claim 5, wherein the one or more processing circuits are configured to:
 provide, responsive to the prevention of the first operation of the refuse vehicle, a user interface that displays an indication that the first operation of the refuse vehicle was prevented; and
 receive, via the user interface, an input to continue the first operation of the refuse vehicle.

8. The refuse vehicle of claim 1, wherein the first object obstructs at least a portion of the second object from view of the first camera, wherein the first data includes second data captured by the first camera and third data captured by the second camera, and wherein the one or more processing circuits are configured to:
 determine, based on the third data captured by the second camera, a distance between the first object and the second object; and
 prevent, based on the distance between the first object and the second object, a grabbing mechanism of the refuse vehicle from engaging with the first object.

9. A refuse vehicle, comprising:
 a camera disposed on the refuse vehicle, the camera configured to capture an area extending from the refuse vehicle; and
 one or more processing circuits in communication with the camera, the one or more processing circuits configured to:
  receive, from the camera, first data associated with a collection site proximate to the refuse vehicle, the collection site including a first object and a second object;
  detect, responsive to receipt of the first data, the first object based on the first data;
  generate, for the first object, one or more bounding boxes to establish a dimension for the first object; and
  determine, using the one or more bounding boxes, a position of the first object relative to the second object.

10. The refuse vehicle of claim 9, wherein the one or more processing circuits are configured to:
 determine, based on one or more time stamps included in the first data and a speed of the refuse vehicle at the one or more time stamps, a size of the first object;
 determine, based on one or more second time stamps included in the first data and a speed of the refuse vehicle at the one or more second time stamps, the position of the first object relative to the second object; and adjust, responsive to determination of the size of the first object and the position of the first object relative to the second object, one or more operations of the refuse vehicle.

11. The refuse vehicle of claim 9, wherein the one or more processing circuits are configured to:
generate a plot including one or more data points corresponding to one or more points in time for when the camera captured data;
associate, using an image captured by the camera, the first object with one or more segments of the plot; and
determine, using the one or more segments of the plot and an operating parameter of the refuse vehicle, the position of the first object relative to the second object.

12. The refuse vehicle of claim 11, comprising a display device located within a cab of the refuse vehicle, and wherein the one or more processing circuits are configured to:
display, via the display device, a user interface including the position of the first object relative to the second object;
receive, via the user interface, an input indicating an adjustment to the position of the first object relative to the second object; and
provide, to a user device, a message specifying the adjustment to the position of the first object relative to the second object.

13. The refuse vehicle of claim 9, wherein the first object is a waste receptable, wherein the second object is a vehicle, and wherein the one or more processing circuits are configured to:
determine, using a distance between the first object and the second object, that a first operation of the refuse vehicle would result in an element of the refuse vehicle moving proximate to the second object; and
prevent, responsive to determining that the first operation of the refuse vehicle would result in the element of the refuse vehicle moving proximate to the second object, the first operation of the refuse vehicle.

14. The refuse vehicle of claim 13, wherein the element is a grabbing mechanism configured to engage with the waste receptacle.

15. The refuse vehicle of claim 13, wherein the one or more processing circuits are configured to:
provide, responsive to the prevention of the first operation of the refuse vehicle, a user interface that displays an indication that the first operation of the refuse vehicle was prevented; and
receive, via the user interface, an input to continue the first operation of the refuse vehicle.

16. The refuse vehicle of claim 9, wherein the first object obstructs at least a portion of the second object from view of the camera, wherein the first data includes second data captured by a second camera of the refuse vehicle, and wherein the one or more processing circuits are configured to:

determine, based on the second data captured by the second camera, a distance between the first object and the second object; and
prevent, based on the distance between the first object and the second object, a grabbing mechanism of the refuse vehicle from engaging with the first object.

17. A control system for a refuse vehicle, comprising:
one or more processing circuits in communication with a camera of the refuse vehicle, the one or more processing circuits configured to:
receive, from the camera, first data associated with a collection site proximate to the refuse vehicle, the collection site including a first object and a second object;
detect, responsive to receipt of the first data, the first object based on the first data;
generate, for the first object, one or more bounding boxes to establish a dimension for the first object; and
determine, using the one or more bounding boxes, a position of the first object relative to the second object.

18. The control system of claim 17, wherein the one or more processing circuits are configured to:
determine, based on one or more time stamps included in the first data and a speed of the refuse vehicle at the one or more time stamps, a size of the first object;
determine, based on one or more second time stamps included in the first data and a speed of the refuse vehicle at the one or more second time stamps, the position of the first object relative to the second object; and
adjust, responsive to determination of the size of the first object and the position of the first object relative to the second object, one or more operations of the refuse vehicle.

19. The control system of claim 17, wherein the one or more processing circuits are configured to:
generate a plot including one or more data points corresponding to one or more points in time for when the camera captured data;
associate, using an image captured by the camera, the first object with one or more segments of the plot; and
determine, using the one or more segments of the plot and an operating parameter of the refuse vehicle, the position of the first object relative to the second object.

20. The control system of claim 17, wherein the one or more processing circuits are configured to:
display, via a display device, a user interface including the position of the first object relative to the second object;
receive, via the user interface, an input indicating an adjustment to the position of the first object relative to the second object; and
provide, to a user device, a message specifying the adjustment to the position of the first object relative to the second object.

* * * * *